(12) United States Patent
Jiang et al.

(10) Patent No.: US 8,981,029 B2
(45) Date of Patent: Mar. 17, 2015

(54) BRANCHED VINYL TERMINATED POLYMERS AND METHODS FOR PRODUCTION THEREOF

(71) Applicant: ExxonMobil Chemical Patents Inc., Baytown, TX (US)

(72) Inventors: Peijun Jiang, League City, TX (US); Patrick Brant, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 6 days.

(21) Appl. No.: 13/901,105

(22) Filed: May 23, 2013

(65) Prior Publication Data

US 2013/0261277 A1  Oct. 3, 2013

Related U.S. Application Data

(62) Division of application No. 13/411,929, filed on Mar. 5, 2012, now Pat. No. 8,623,974.

(60) Provisional application No. 61/467,681, filed on Mar. 25, 2011.

(51) Int. Cl.
| | | |
|---|---|---|
| *C08F 10/02* | (2006.01) | |
| *C08F 10/06* | (2006.01) | |
| *C08F 110/06* | (2006.01) | |
| *C08F 210/06* | (2006.01) | |
| *C08F 4/6592* | (2006.01) | |
| *C08F 255/02* | (2006.01) | |
| *C08F 10/00* | (2006.01) | |
| *C08F 110/02* | (2006.01) | |
| *C08F 4/659* | (2006.01) | |

(52) U.S. Cl.
CPC ............. *C08F 110/06* (2013.01); *C08F 255/02* (2013.01); *C08F 10/00* (2013.01); *C08F 210/06* (2013.01); *C08F 110/02* (2013.01); *C08F 4/65908* (2013.01); *C08F 4/65912* (2013.01)
USPC ....................................... 526/348; 526/348.2

(58) Field of Classification Search
CPC ........ C08F 10/02; C08F 10/06; C08F 110/06; C08F 210/06; C08F 4/65927
USPC .............................................. 526/348, 348.2
See application file for complete search history.

(56) References Cited

U.S. PATENT DOCUMENTS

| | | | |
|---|---|---|---|
| 3,022,305 A | 2/1962 | Carboni | |
| 3,235,484 A | 2/1966 | Colfer | |
| 4,069,023 A | 1/1978 | Brois et al. | |
| 4,110,377 A | 8/1978 | Clerici et al. | |
| 4,197,398 A | 4/1980 | Floyd et al. | |
| 4,619,756 A | 10/1986 | Dickakian | |
| 4,814,540 A | 3/1989 | Watanabe et al. | |
| 4,973,414 A | 11/1990 | Nerger et al. | |
| 4,988,764 A | 1/1991 | Nishio et al. | |
| 5,026,948 A | 6/1991 | Forbus | |
| 5,049,535 A | 9/1991 | Resconi et al. | |
| 5,211,834 A | 5/1993 | Forester | |
| 5,229,022 A | 7/1993 | Song et al. | |
| 5,252,677 A | 10/1993 | Tomita et al. | |
| 5,266,186 A | 11/1993 | Kaplan | |
| 5,382,634 A | 1/1995 | Koyama et al. | |
| 5,439,607 A | 8/1995 | Patil | |
| 5,444,125 A | 8/1995 | Tomita et al. | |
| 5,498,809 A | 3/1996 | Emert et al. | |
| 5,504,172 A | 4/1996 | Imuta et al. | |
| 5,705,577 A | 1/1998 | Rossi et al. | |
| 5,741,946 A | 4/1998 | Wei | |
| 5,744,541 A | 4/1998 | Sawaguchi et al. | |
| 5,750,815 A | 5/1998 | Grubbs et al. | |
| 5,756,428 A | 5/1998 | Emert et al. | |
| 5,811,379 A | 9/1998 | Rossi et al. | |
| 5,859,159 A | 1/1999 | Rossi et al. | |
| 5,936,041 A | 8/1999 | Diana et al. | |
| 6,017,859 A | 1/2000 | Rossi et al. | |
| 6,114,445 A | 9/2000 | Tzoganakis et al. | |
| 6,117,962 A | 9/2000 | Weng et al. | |
| 6,143,686 A | 11/2000 | Vizzini et al. | |
| 6,197,910 B1 | 3/2001 | Weng et al. | |
| 6,225,432 B1 | 5/2001 | Weng et al. | |

(Continued)

FOREIGN PATENT DOCUMENTS

| | | |
|---|---|---|
| CN | 101011062 | 8/2007 |
| EP | 0 767 182 | 4/1997 |

(Continued)

OTHER PUBLICATIONS

Amin et al., "Versatile Pathways for In Situ Polyolefin Functionalization with Heteroatoms: Catalytic Chain Transfer", Angewandte Chemie International Edition, 2008, vol. 47, pp. 2006-2025.

Ayinla et al., "Chiral Tantalum and Zironium Biphenyl Amidate Complexes: New Catalysts for the Assymetric Synthesis of Amines", Abstracts of Papers, 238th ACS National Meeting, Washington DC, United States, Aug. 16-20, 2009, INOR-252.

Babu et al., "Microstructure of Poly(1-hexene) Produced by ansa-Zirconocenium Catalysis", Macromolecules, 1994, vol. 27, pp. 3383-3388.

Balboni et al., "C2-Symmetric Zirconocenes for High Molecular Weight Amorphous Poly(propylene)", Macromolecular Chemistry and Physics, 2001, vol. 202, No. 10, pp. 2010-2028.

(Continued)

*Primary Examiner* — Caixia Lu
(74) *Attorney, Agent, or Firm* — Catherine L. Bell

(57) ABSTRACT

This invention relates to a process for polymerization, comprising (i) contacting, at a temperature greater than 35° C., one or more monomers comprising ethylene and/or propylene, with a catalyst system comprising a metallocene catalyst compound and an activator, (ii) converting at least 50 mol % of the monomer to polyolefin; and (iii) obtaining a branched polyolefin having greater than 50% allyl chain ends, relative to total unsaturated chain ends. The invention also relates to the branched polyolefins and functionalized branched polyolefins.

22 Claims, 1 Drawing Sheet

(56) References Cited

U.S. PATENT DOCUMENTS

| | | |
|---|---|---|
| 6,255,426 B1 | 7/2001 | Lue et al. |
| 6,268,518 B1 | 7/2001 | Resconi et al. |
| 6,410,666 B1 | 6/2002 | Grubbs et al. |
| 6,444,773 B1 | 9/2002 | Markel |
| 6,448,350 B1 | 9/2002 | Dall'Occo et al. |
| 6,476,167 B2 | 11/2002 | Peters |
| 6,525,157 B2 | 2/2003 | Cozewith et al. |
| 6,703,457 B2 | 3/2004 | Van Baar et al. |
| 6,750,307 B2 | 6/2004 | Weng et al. |
| 6,897,261 B1 | 5/2005 | Machida et al. |
| 6,939,930 B2 | 9/2005 | Reinking et al. |
| 7,126,031 B2 | 10/2006 | Boussie et al. |
| 7,247,385 B1 | 7/2007 | Tzoganakis et al. |
| 7,276,567 B2 | 10/2007 | Voskoboynikov et al. |
| 7,294,681 B2 | 11/2007 | Jiang et al. |
| 2,261,292 A1 | 12/2007 | Jiang et al. |
| 7,524,910 B2 | 4/2009 | Jiang et al. |
| 7,541,413 B2 | 6/2009 | Crowther et al. |
| 7,589,160 B2 | 9/2009 | Resconi et al. |
| 7,790,810 B2 | 9/2010 | Coates et al. |
| 7,799,879 B2 | 9/2010 | Crowther et al. |
| 7,820,607 B2 | 10/2010 | Matsuda et al. |
| 7,897,785 B2 | 3/2011 | Stevens et al. |
| 7,943,716 B2 | 5/2011 | Resconi et al. |
| 7,960,487 B2 | 6/2011 | Yang et al. |
| 8,058,351 B2 | 11/2011 | Pawlow et al. |
| 2002/0137978 A1 | 9/2002 | Grubbs et al. |
| 2003/0161752 A1 | 8/2003 | Luk et al. |
| 2004/0054086 A1 | 3/2004 | Schauder et al. |
| 2004/0127649 A1 | 7/2004 | Arjunan |
| 2004/0214953 A1 | 10/2004 | Yamada et al. |
| 2004/0249046 A1 | 12/2004 | Abhari et al. |
| 2005/0054793 A1 | 3/2005 | Reinking et al. |
| 2005/0159299 A1 | 7/2005 | Rodriguez et al. |
| 2005/0261440 A1 | 11/2005 | Dickakian et al. |
| 2006/0052553 A1 | 3/2006 | Resconi et al. |
| 2006/0270814 A1 | 11/2006 | Mako et al. |
| 2008/0228017 A1 | 9/2008 | Burdett et al. |
| 2008/0234451 A1 | 9/2008 | Kenwright et al. |
| 2009/0198089 A1 | 8/2009 | Burton et al. |
| 2009/0221750 A1 | 9/2009 | Tsunogae et al. |
| 2009/0247441 A1 | 10/2009 | Baum |
| 2009/0318640 A1 | 12/2009 | Brant et al. |
| 2009/0318644 A1 | 12/2009 | Brant et al. |
| 2009/0318646 A1 | 12/2009 | Brant et al. |
| 2010/0069573 A1 | 3/2010 | Arriola et al. |
| 2010/0152388 A1 | 6/2010 | Jiang et al. |
| 2010/0170829 A1 | 7/2010 | Ng et al. |

FOREIGN PATENT DOCUMENTS

| | | |
|---|---|---|
| EP | 0 802 216 | 10/1997 |
| EP | 0 958 309 | 11/1999 |
| EP | 1 361 232 | 11/2003 |
| EP | 1 849 757 | 10/2007 |
| EP | 1 862 491 | 12/2007 |
| GB | 1 310 847 | 3/1973 |
| JP | 02-064115 | 3/1990 |
| JP | 1993/320260 | 3/1993 |
| JP | 2000/038420 | 2/2000 |
| JP | 2005/139284 | 6/2005 |
| JP | 2005/336092 | 12/2005 |
| JP | 2007/169340 | 7/2007 |
| JP | 2007/246433 | 9/2007 |
| JP | 2008/050278 | 3/2008 |
| JP | 2009/299046 | 12/2009 |
| JP | 2010/037555 | 2/2010 |
| JP | 2010/202628 | 9/2010 |
| JP | 2011/026448 | 2/2011 |
| JP | 2012/051859 | 3/2012 |
| JP | 2012/052062 | 3/2012 |
| WO | WO 95/27717 | 10/1995 |
| WO | WO 97/47665 | 12/1997 |
| WO | WO 99/05182 | 2/1999 |
| WO | WO 99/46270 | 9/1999 |
| WO | WO 00/00576 | 1/2000 |
| WO | WO 00/55218 | 9/2000 |
| WO | WO 03/040095 | 5/2003 |
| WO | WO 03/040233 | 5/2003 |
| WO | WO 03/040442 | 5/2003 |
| WO | WO 2004/031250 | 4/2004 |
| WO | WO 2004/046214 | 6/2004 |
| WO | WO 2005/090425 | 9/2005 |
| WO | WO 2005/090426 | 9/2005 |
| WO | WO 2005/090427 | 9/2005 |
| WO | WO 2005/092935 | 10/2005 |
| WO | WO 2006/127483 | 11/2006 |
| WO | WO 2007/003238 | 1/2007 |
| WO | WO 2008/027268 | 3/2008 |
| WO | WO 2008/080081 | 7/2008 |
| WO | WO 2008/141941 | 11/2008 |
| WO | WO 2009/009158 | 1/2009 |
| WO | WO 2009/155517 | 12/2009 |
| WO | WO 2010/037059 | 4/2010 |

OTHER PUBLICATIONS

Baldwin et al., "Cationic Alkylaluminum-Complexed Zirconocene Hydrides as Participants in Olefin Polymerization Catalysis", JACS, 2010, vol. 132, pp. 13969-13971.

Bhriain et al., "Polymeryl-Exchange Between Ansa-Zirconocene Catalysts for Norbornene-Ethene Copolymerization: Atom Transfer Radical Polymerization Approach", Macromolecules, 2000, vol. 33, pp. 678-680.

Bielawski et al., "Synthesis of ABA Triblock Copolymers via a Tandem Ring-Opening Metathesis P olymerization: Atom Transfer Radical Polymerization Approach", Macromolecules, 2000, vol. 33, pp. 678-680.

Brant et al., "Effect of Tacticity on the Dilute Solution Coil Dimensions of Poly(a-olefin)s", Macromolecules, 2005, vol. 38, pp. 7178-7183.

Britovsek et al., Novel Olefin Polymerization Catalysts Based on Iron and Cobalt, Chemical Communications, 1998, No. 7, pp. 849-850.

Britovsek et al., Iron and Cobalt Ethylene Polymerization Catalysts Bearing 2,6-Bis(Imino)Pyridyl Ligands: Synthesis, Structures, and Polymerization Studies, Journal of the American Chemical Society, 1999, vol. 121, No. 38, pp. 8728-8740.

Brzezinska et al., Brzezinska et al., "Synthesis of ABA Triblock Copolymers via Acyclic Diene Metathesis Polymerization and Living Polymerization of a-Amino Acid-N-Carboxyanhydrides", Macromolecules, 2001, vol. 34, pp. 4348-4354.

Bujadoux et al., Use of Bridged and Non-bridged Metallocene Catalysts in High Pressure/High Temperature Ethylene/α-olefin Copolymerization, Metallocene Polymers, 1995, pp. 377-402.

Chen et al., Preparation of Epoxy-modified Polyethylene by Graft Extrusion and its Applications to Polyphenylene Sulfide Alloys as a Compatibilizer, Reactive & Functional Polymers, 2008, vol. 68, No. 9, pp. 1307-1313.

Cherian et al., "Synthesis of Allyl-Terminated Syndiotactic Polypropylene: Macromonomers for the Synthesis of Branched Polyolefins", Macromolecules, 2005, vol. 38, pp. 6259-6268.

Chung, "Synthesis of Functional Polyolefin Copolymers with Graft and Block Structures", Progress in Polymer Science, 2002, vol. 27, pp. 39-85.

Clerici et al., "Catalytic C-Alkylation of Secondary Amines With Alkenes", Synthesis, 1980, vol. 4, pp. 305-306.

Corey et al., "Reactions of Hydrosilanes and Olefins in the Presence of Cp2MC12/nBuLi", Organometallics, 1992, vol. 11, pp. 672-683.

Cossy et al., "Cross-Metathesis reaction. Generation of Highly Functionalized Olefins from Unsaturated Alcohols", Journal of Organometallic Chemistry, 2001, vol. 634, Issue 2, pp. 216-221.

Crowther et al., "Group 4 Metal Dicarbollide Chemistry. Synthesis, Structure, and Reactivity of Electrophilie Alkyl Complexes (Cp*)(C2B9H11)M(R) (M=Hf, Zr)", JACS, 1991, vol. 113, pp. 1455-1457.

Deeken et al., "How Common Are True Aminopyridinato Complexes?", Z. Anorg. Allg. Chem., 2007, vol. 633, pp. 320-325.

Doring et al., "Aminopyridinate-Stabilized Lanthanoid Complexes: Synthesis, Structure and Polymerization of Ethylene and Isoprene", Eur. J. Inorg. Chem., 2010, pp. 2853-2860.

(56) References Cited

OTHER PUBLICATIONS

Eisenberger et al., "*Tantalum-amidate Complexes for the Hydroaminoalkylation of Secondary Amines: Enhanced Substrate Scope and Enantioselective Chiral Amine Synthesis*", Angewandte Chemie International Edition, 2009, vol. 48, pp. 8361-8365.
Eshuis et al., "*Catalytic Olefin Oligomerization and Polymerization with Cationic Group IV Metal Complexes [Cp*₂Mme(THT)]⁺ [BPh₄]hu −, M=Ti, Zr and Hf*", Journal of Molecular Catalysis, 1990, vol. 62, pp. 277-287.
Frauenrath et al., "Polymerization of 1-Hexene Catalyzed by Bis(Cyclopentadienyl)Zirconium Dichloride/Methylaluminoxane; Effect of Temperature on the Molecular Weight and the Microstructure of Poly(1-Hexene)", Macromol. Rapid Commun., 1998, vol. 19, pp. 391-395.
Furuyama et al., "New High-Performance Catalysts Developed at Mitsui Chemicals for Polyolefins and Organic Synthesis", Catalysis Surveys from Asia, 2004, vol. 8, No. 1, pp. 61-71.
Galeotti et al., "Self-Functionalizing Polymer Film Surfaces Assisted by Specific Polystyrene EndTagging",Chem. Mater., 2010, vol. 22, pp. 2764-2769.
Glatz et al., "First Row Transition Metal Aminopyridinates—the Missing Complexes", Eur. J. Inorg. Chem., 2009, pp. 1385-1392.
Hansell et al., Additive-Free Clicking for Polymer Functionalization and Coupling by TetrazineNorbornene Chemistry, Journal of the American Chemical Society, 2011, vol. 133, No. 35, pp. 13828-13831.
Harney et al., "End-Group-Confined Chain Walking Within a Group 4 Living Polyolefin and Well-Defined Cationic Zirconium Alkyl Complexes for Modeling This Behavior", JACS, 2004, vol. 126, pp. 4536-4537.
Herzon et al., "Direct, Catalytic Hydroaminoalkylation of Unactivated Olefins with N-Alkyl Arylamines", JACS, 2007, vol. 129, pp. 6690-6691.
Herzon et al., "Hydroaminoalkylation of Unactivated Olefins with Dialkylamines", JACS, 2007, vol. 130, pp. 14940-14941.
Janiak et al., "Analyses of Propene and 1-Hexene Oligomers from Zirconium/MAO Catalysts—Mechanistic Implications by NMR, SEC, and MALDI-TOF MS", Macromol. Chem. Phys., 2002, vol. 203, pp. 129-138.
Janiak et al., "Metallocene Catalysts for Olefin Oligomerization", Macromol. Symp., 2006, vol. 236, pp. 14-22.
Janiak et al., "Metallocene and Related Catalysts for Olefin, Alkyne and Silane Dimerization and Oligomerization", Coordination Chemistry Reviews, 2006, vol. 250, pp. 66-94.
Jiang et al., "Highly Z-Selective Metathesis Homocoupling of Terminal Olefins", JACS, 2009, vol. 131, pp. 16630-16631.
Jones et al., "Synthesis and Reactive Blending of Amine and Anhydride End-Functional Polyolefins", Polymer, 2004, vol. 45, pp. 4189-4201.
Kaneyoshi et al., "Synthesis of Block and Graft Copolymers with Linear Polyethylene Segments by Combination of Degenerative Transfer Coordination Polymerization and Atom Transfer Radical Polymerization", Macromolecules, 2005, vol. 38, pp. 5425-5435.
Kempe, "The Strained η-NAmido-NPyridine Coordination of Aminopyridinato Ligands", Eur. J. Inorg. Chem., 2003, pp. 791-803.
Kesti et al., "Group 4 Metallocene Olefin Hydrosilyation Catalysts", Organometallics, 1992, vol. 11, pp. 1095-1103.
Kissin et al., "Post-Oligomerization of a-Olefin Oligomers: A Route to Single-Component and Multipcomponent Synthetic Lubricating Oils", Journal of Applied Polymer Science, 2009, vol. 111, pp. 273-280.
Kobayashi, "Routes to Functionalized Polyolefins", The Dow Chemical Company.
Kolodka et al., "Copolymerization of Propylene with Poly(Ethylene-Co-Propylene) Macromonomer and Branch Chain-Length Dependence of Rheological Properties", Macromolecules, 2002, vol. 35, pp. 10062-10070.
Kolodka et al., "Synthesis and Characterization of Long-Chain-Branched Polyolefins with Metallocene Catalysts: Copolymerization of Ethylene with Poly(Ethylene-Co-Propylene) Macromonomer", Macromol. Rapid Commun., 2003, vol. 24, pp. 311-315.
Koo et al., "Efficient New Routes to Functionalized Polyolefms", ChemTech. 1999, pp. 13-19.
Koo et al., "Silicon-Modified Ziegler-Natta Polymerization. Catalytic Approaches to Silyl-Capped and Silyl-Linked Polyolefms Using "Single-Site" Cationic Ziegler-Natta Catalysts", JACS, 1999, vol. 121, pp. 8791-8802.
Kostalik et al., "Solvent Processable Tetraalkylammonium-Functionalized Polyethylene for Use as an Alkaline Anion Exchange Membrane", Macromolecules, 2010, vol. 43, pp. 7147-7150.
Kubiak et al., "Titanium-Catalyzed Hydroaminoalkylation of Alkenes by C—H Bond Activation at SP3 Centers in the Alpha-Position to a Nitrogen Atom", Angewandte Chemie International Edition, 2009, vol. 48, No. 6, pp. 1153-1156.
Langston et al., "One-Pot Synthesis of Long Chain Branch PP (LCBPP) Using Ziegler-Natta Catalyst and Branching Reagents", Macromol. Symp., 2007, vol. 260, pp. 34-41.
Lehmus et al., "Chain End Isomerization as a Side Reaction in Metallocene-Catalyzed Ethylene and Propylene Polymerizations", Macromolecules, 2000, vol. 33, pp. 8534-8540.
Liu et al., Kinetics of Initiation, Propagation, and Termination for the [rac-(C2H4(1-indenyl)2)ZrMe] {MeB(C6F5)3]-Catalyzed Polymerization of 1-Hexene, Journal of the American Chemical Society, 2001, vol. 123, pp. 11193-11207.
Lopez et al., "Synthesis of Well-Defmed Polymer Architectures by Successive Catalytic Olefin Polymerization and Living/Controlled Polymerization Reactions", Progress in Polymer Science, 2007, vol. 32, pp. 419-454.
Lu et al., "}eactivity of Common Functional Groups with Urethanes: Models for Reactive Compatibilization of Thermoplastic Polyurethane Blends", Journal of Polymer Science: Part A: Polymer Chemistry, 2002, vol. 40, pp. 2310-2328.
Markel et al., "Metallocene-Based-Branch—Block Thermoplastic Elastomers", Macromolecules, 2000, vol. 33, pp. 8541-8548.
Mathers et al., "Cross Metathesis Functionalization of Polyolefms", Chem. Commun., 2004, pp. 422-423.
Moscardi et al., "Propene Polymerization with the Isospecific, Highly Regioselective rac-Me2 C(3-t-Bu-1- Ind)2ZrCl2/MAO Catalyst. 2. Combined DFT/MM Analysis of Chain Propagation and Chain Release Reactions", Organometallics, 2001, vol. 20, pp. 1918-1931.
Nagai et al., Novel Well-defined Funcationalized Polyolefins and Polyolefin-polar Polymer Block Copolymers: Formations and Their Features, Poly Preprints, 2008, vol. 49, No. 2, 776-777.
Nakatsuka et al., Creation and Application of New Materials by a Fusion of FI-catalyst Technology and Fine Organic Synthesis Technology, Shokubai, 2010, vol. 52, No. 8, pp. 569-574.
Negishi et al., "Reaction of Zirconocene Dichloride with Alkyllithiums or Alkyl Grignard Reagents as a Convenient Method for Generating a "Zirconocene" Equivalent and its Use in Zirconium-Promoted Cyclization of Alkenes, Alkynes, Dienes, Enynes, and Diyness1", Tetrahedron Letters, 1986, vol. 27, No. 25, pp. 2829-2832.
Nilsson et al., "Structural Effects on Thermal Properties and Morphology in XLPE", European Polymer Journal, 2010, vol. 46, pp. 1759-1769.
Ornealis et al., "Cross Olefin Metathesis for the Selective Functionalization, Ferrocenylation, and Solubilization in Water of Olefin-Terminated Dendrimers, Polymers, and Gold Nanoparticles and for a Divergent Dendrimer Construction", JACS, 2008, vol. 130, pp. 1495-1506.
Ornealis et al., "Efficient Mono- and Bifunctionalization of Polyolefin Dendrimers by Olefin Metathesis", Angewandte Chemie International Edition, 2005, vol. 44, pp. 7399-7404.
Parks et al., "Studies on the Mechanism of B(C6F5)3-Catalyzed Hydrosilation of Carbonyl Functions", J. Org. Chem., 2000, vol. 65, pp. 3090-3098.
Passaglia et al., "Grafting of Diethyl Maleate and Maleic Anhydride Onto Styrene-b-(Ethylene-co-1-Butene)-b-Styrene Triblock Copolymer (SEBS)", Polymer, 2000, vol. 41, pp. 4389-4400.

(56) References Cited

OTHER PUBLICATIONS

Prochnow et al., "Tetrabenzyltitanium: An Improved Catalyst for the Activation of SP3 C—H Bonds Adjacent to Nitrogen Atoms", ChemCatChem, 2009, vol. 1, No. 1, pp. 162-172.

Quirk et al., "Anionic Synthesis of Secondary Amine Functionalized Polymers by Reaction of Polymeric Organolithiums with N-Benzylidenemethylamine", Macromolecular Chemistry and Physics, 2002, vol. 203, pp. 1178-1187.

Resconi et al., "Chain Transfer Reactions in Propylene Polymerization with Zirconocene Catalysts", Topics in Catalysis, 1999, vol. 7, pp. 145-163.

Resconi et al., "Olefin Polymerization at Bis(pentamethylcyclopentadieny)zirconium and -hafnium Centers: Chain-Transfer Mechanisms", JACS, 1992, vol. 114, pp. 1025-1032.

Reznichenko et al., "Group 5 Metal Binaptholate Complexes for Catalytic Asymmetric Hydroaminoalkylation and Hydroamination/Cyclization", Organometallics, 2011, vol. 30, pp. 921-924.

Rodriguez et al., Poly(4-vinylpyridazine). First Synthesis, Characterization and Properties, Polymeric Materials Science and Engineering, Proceedings of the ACS Division of Polymeric Materials Science and Engineering, 1990, vol. 63, pp. 376-382 (Abstract).

Roesky, "Catalytic Hydroaminoalkylation", Angewandte Chemie International Edition, 2009, vol. 48, pp. 4892-4894.

Rose et al., "Poly(Ethylene-Co-Propylene Macromonomer)s: Synthesis and Evidence for Starlike Conformations in Dilute Solution", Macromolecules, 2008, vol. 41, pp. 559-567.

Rossi et al., "End Groups in 1-Butene Polymerization Via Methylaluminoxane and Zirconocene Catalyst", Macromolecules, 1995, vol. 28, pp. 1739-1749.

Rulhoff et al., "Synthesis and Characterization of Defined Branched Poly(propylene)s with Different Microstructures by Copolymerization of Propylene and Linear Ethylene Oligomers (Cn=26-28) with Metallocenes/MAO Catalysts", Macromolecules, 2006, vol. 16, pp. 1450-1460.

Rybak et al., "Acyclic Diene Metathesis with a Monomer with a Monomer from Renewable Resources: Control of Molecular Weight and One-Step Preparation of Block Copolymers", ChemSusChem, 2008, vol. 1, pp. 542-547.

Scherman et al., "Synthesis and Characterization of Stereoregular Ethylene-Vinyl Alcohol Copolymers Made by Ring-Opening Metathesis Polymerization", Macromolecules, 2005, vol. 38, pp. 9009-9014.

Scott et al., "Di- and Trivalent Lanthanide Complexes Stabilized by Sterically Demanding Aminop3rridinato Ligands", Eur. J. Inorg. Chem., 2005, pp. 1319-1324.

Seayed et al., "Hydroaminomethylation of Olefins Using a Rhodium Carbene Catalyst", Tetrahedron Letters, 2003, vol. 44, No. 8, pp. 1679-1683.

Segawa et al., "Catalytic Hydroaminoalkylation of Alkene", Yuki Gosei Kagaku Kyokaishi, 2009, vol. 67, No. 8, pp. 834-844 (Abstract only).

Shiono et al., "Additive Effects of Trialkylaluminum on Propene Polymerization with (t-BuNSiMe2F1u)TiMe2- Based Catalysts", Applied Catalysis A: General, 2000, vol. 200, pp. 145-152.

Shiono et al., "Copolymerization of Atactic Polypropene Macromonomer with Propene by an Isospecific Metallocene Catalyst", Macromolecules, 1999, vol. 32, pp. 5723-5727.

Shiono et al., Copolymerization of poly(propylene) macromonomer with ethylene by (tert-butanamide)dimethyl(tetramethyl-qscyclopentadienyl) silane titanium dichloride/methylaluminoxane catalyst, Macromol. Chem. Phys., 1997, vol. 198, pp. 3229-3237.

Sill et al., "Bis-Dendritic Polyethylene Prepared by Ring-Opening Metathesis Polymerization in the Presence of Bis-Dendritic Chain Transfer Agents", Journal of Polymer Science: Part A: Polymer Chemistry, 2005, vol. 43, pp. 5429-5439.

Small et al., "Polymerization of Propylene by a New Generation of Iron Catalysts: Mechanisms of Chain Initiation, Propagation, and Termination", Macromolecules, 1999, vol. 32, pp. 2120-2130.

Stadler et al., "Long-Chain Branches in Syndiotactic Polypropene Induced by Vinyl Chloride", Macromolecular Chemistry. And Physics, 2010, vol. 211, pp. 1472-1481.

Sun et al., "Effect of Short Chain Branching on the Coil Dimensions of Polyolefins in Dilute Solution", Macromolecules, 2001, vol. 34, pp. 6812-6820.

Sunderhaus et al., "Oxidation of Carbon-Silicon Bonds: The Dramatic Advantage of Strained Siletanes", Organic Letters, 2003, vol. 5, No. 24, pp. 4571-4573.

Switek et al., "ABA Triblock Copolymers with a Ring-Opening Metathesis Polymerization/Macromolecular Chain-Transfer Agent Approach", Journal of Polymer Science: Part A: Polymer Chemistry, 2007, vol. 45, pp. 361-373.

Thomas et al., "Synthesis of Telechelic Polyisoprene via Ring-Opening Metathesis Polymerization in the Presence of Chain Transfer Agent", Macromolecules, 2010, vol. 43, pp. 3705-3709.

Wei et al., "Aufbaureaktion Redux: Scalable Production of Precision Hydrocarbons from AlR3 (R=Et or iBu) by Dialkyl Zinc Mediated Ternary Living Coordinative Chain-Transfer Polymerization", Angewandte Chemie Inernational Edition, 2010, vol. 49, pp. 1768-1772.

Weng et al., "Long Chain Branched Isotactic Polypropylene", Macromolecules, 2002, vol. 35, pp. 3838-3843.

Weng et al., "Synthesis of Vinly-Terminated Isotactic Poly(Propylene)", Macromol. Rapid Commun., 2000, vol. 21, pp. 1103-1107.

Weng et al., Synthesis of Long-Chain Branched Propylene Polymers via Macromonomer Incorporation, Macromol. Rapid Commun., 2001, vol. 22, No. 18, pp. 1488-1492.

Xu et al., Ethylene Copolymerization with 1-Octene Using a 2-Methylbenz[e]indenyl-Based ansa-Monocyclopentadienylamido Complex and Methylaluminoxane Catalyst, Macromolecules, 1998, vol. 31, pp. 4724-4729.

Yang et al., "Catatonic Metallocene Polymerization Catalysts, Synthesis and Properties of the First Base-Free Zirconocene Hydride", Angewandte Chemie International Edition Engl., 1992, vol. 31, pp. 1375-1377.

Yin et al., "Scope and Mechanism of Allylic C—H Amination of Terminal Alkenes by the Palladium/PhL(OPiv)2 Catalyst System: Insights into the Effect of Naphthoquinone", JACS, 2010, vol. 132, pp. 11978-11987.

Zhang et al., "Functionalization of Polyolefins Through Catalytic Hydrosilylation and Imidation Reactions", ANTEC, 2005, pp. 2686-2690.

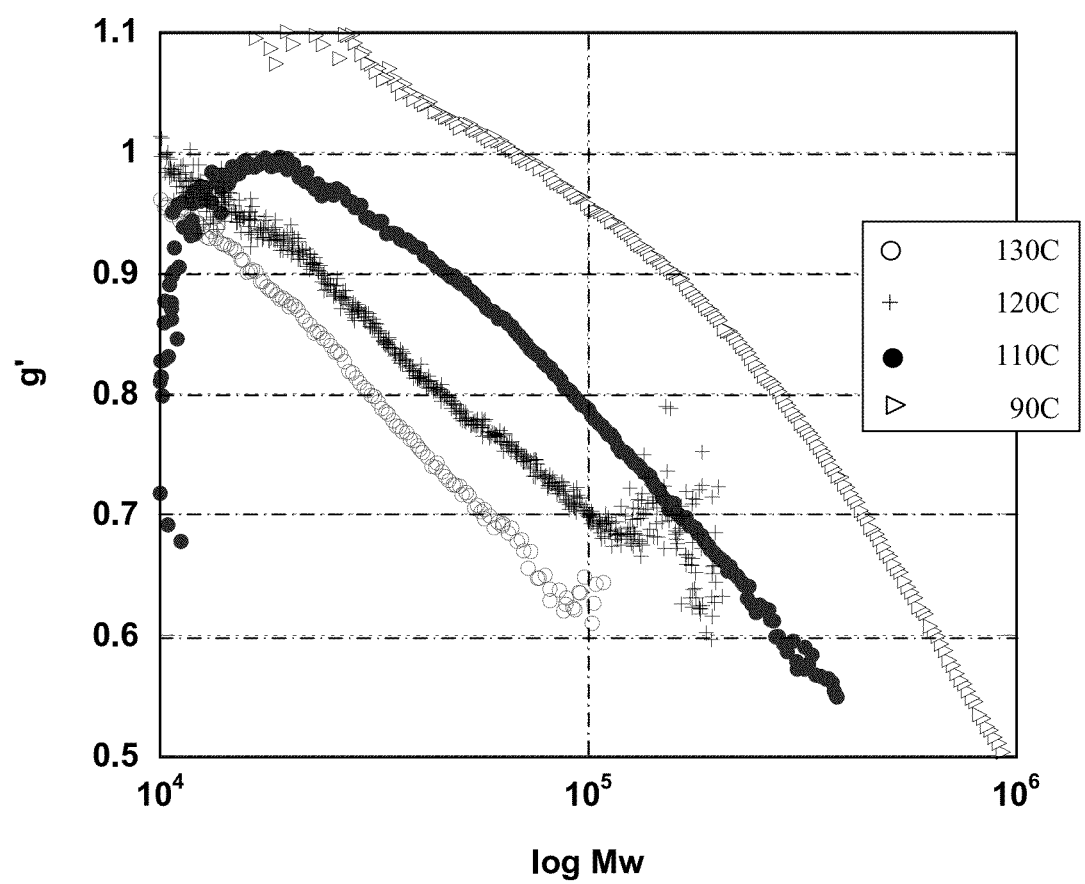

BRANCHED VINYL TERMINATED POLYMERS AND METHODS FOR PRODUCTION THEREOF

CROSS-REFERENCE TO RELATED APPLICATION

This application is a Divisional of, and claims priority to, U.S. Ser. No. 13/411,929 filed on Mar. 5, 2012; and also claims priority to and the benefit of 61/467,681, filed Mar. 25, 2011.

FIELD OF THE INVENTION

This invention relates to olefin polymerization, particularly to produce vinyl terminated polymers.

BACKGROUND OF THE INVENTION

Alpha-olefins, especially those containing about 6 to about 20 carbon atoms, have been used as intermediates in the manufacture of detergents or other types of commercial products. Such alpha-olefins have also been used as comonomers, especially in linear low density polyethylene. Commercially produced alpha-olefins are typically made by oligomerizing ethylene. Longer chain alpha-olefins, such as vinyl-terminated polyethylenes are also known and can be useful as building blocks following functionalization or as macromonomers.

Allyl terminated low molecular weight solids and liquids of ethylene or propylene have also been produced, typically for use as branches in polymerization reactions. See, for example, Rulhoff, Sascha and Kaminsky, ("Synthesis and Characterization of Defined Branched Poly(propylene)s with Different Microstructures by Copolymerization of Propylene and Linear Ethylene Oligomers ($C_n$=26-28) with Metallocenes/MAO Catalysts," Macromolecules, 16, 2006, pp. 1450-1460), and Kaneyoshi, Hiromu et al. ("Synthesis of Block and Graft Copolymers with Linear Polyethylene Segments by Combination of Degenerative Transfer Coordination Polymerization and Atom Transfer Radical Polymerization," Macromolecules, 38, 2005, pp. 5425-5435).

Further, U.S. Pat. No. 4,814,540 discloses bis(pentamethyl cyclopentadienyl) hafnium dichloride, bis(pentamethyl cyclopentadienyl) zirconium dichloride and bis(tetramethyl n-butyl cyclopentadienyl) hafnium dichloride with methylalumoxane in toluene or hexane with or without hydrogen to make allylic vinyl terminated propylene homo-oligomers having a low degree of polymerization of 2-10. These oligomers do not have high Mns and do not have at least 93% allylic vinyl unsaturation. Likewise, these oligomers lack comonomer and are produced at low productivities with a large excess of alumoxane (molar ratio ≥600 Al/M; M=Zr, Hf). Additionally, no less than 60 wt % solvent (solvent+propylene basis) is present in all of the examples.

Teuben, et al. (J. Mol. Catal., 62, 1990, pp. 277-287) discloses the use of [Cp*$_2$MMe(THT)]+[BPh$_4$] (M=Zr and Hf; Cp*=pentamethylcyclopentadienyl; Me=methyl, Ph=phenyl; THT=tetrahydrothiophene), to make propylene oligomers. For M=Zr, a broad product distribution with oligomers up to $C_{24}$ (number average molecular weight (Mn) of 336) was obtained at room temperature. Whereas, for M=Hf, only the dimer 4-methyl-1-pentene and the trimer 4,6-dimethyl-1-heptene were formed. The dominant termination mechanism appeared to be beta-methyl transfer from the growing chain back to the metal center, as was demonstrated by deuterium labeling studies.

X. Yang, et al. (Angew. Chem. Intl Ed. Engl., 31, 1992, pp. 1375) discloses amorphous, low molecular weight polypropylene made at low temperatures where the reactions showed low activity and product having 90% allylic vinyls, relative to all unsaturations, by $^1$H NMR. Thereafter, Resconi, et al. (J. Am. Chem. Soc., 114, 1992, pp. 1025-1032), discloses the use of bis(pentamethylcyclopentadienyl)zirconium and bis(pentamethylcyclopentadienyl)hafnium to polymerize propylene and obtained beta-methyl termination resulting in oligomers and low molecular weight polymers with "mainly allyl- and iso-butyl-terminated" chains. As is the case in U.S. Pat. No. 4,814,540, the oligomers produced do not have at least 93% allyl chain ends, an Mn of about 500 to about 20,000 g/mol (as measured by $^1$H NMR), and the catalyst has low productivity (1-12,620 g/mmol metallocene/hr; >3000 wppm Al in products).

Similarly, Small and Brookhart, (Macromolecules, 32, 1999, pp. 2322) disclose the use of a pyridylbisamido iron catalyst in a low temperature polymerization to produce low molecular weight amorphous propylene materials apparently having predominant or exclusive 2,1 chain growth, chain termination via beta-hydride elimination, and high amounts of vinyl end groups.

Weng et al. (Macromol Rapid Comm. 2000, 21, pp. 1103-1107) discloses materials with up to about 81% vinyl termination made using dimethylsilyl bis(2-methyl, 4-phenyl-indenyl) zirconium dichloride and methylalumoxane in toluene at about 120° C. The materials have a Mn of about 12,300 (measured with $^1$H NMR) and a melting point of about 143° C.

Markel et al. (Macromolecules, 33, 2000, pp. 8541-8548) discloses comb branch-block polyethylene made with $Cp_2ZrCl_2$ and $(C_5Me_4SiMe_2NC_{12}H_{23})TiCl_2$, activated with methyl alumoxane.

Moscardi, et al. (Organometallics, 20, 2001, pp. 1918) discloses the use of rac-dimethylsilylmethylenebis(3-t-butyl indenyl)zirconium dichloride with methylalumoxane in batch polymerizations of propylene to produce materials where "... allyl end group always prevails over any other end groups, at any [propene]." In these reactions, morphology control was limited and approximately 60% of the chain ends are allylic.

Coates, et al. (Macromolecules, 38, 2005, pp. 6259) discloses preparation of low molecular weight syndiotactic polypropylene ([rrrr]=0.46-0.93) with about 100% allyl end groups using bis(phenoxyimine)titanium dichloride ((PHI)$_2$TiCl$_2$) activated with modified methyl alumoxane (MMAO; Al/Ti molar ratio=200) in batch polymerizations run between −20° C. and +20° C. for four hours. For these polymerizations, propylene was dissolved in toluene to create a 1.65 M toluene solution. Catalyst productivity was very low (0.95 to 1.14 g/mmol Ti/hr).

JP 2005-336092 A2 discloses the manufacture of vinyl-terminated propylene polymers using materials such as $H_2SO_4$ treated montmorillonite, triethylaluminum, triisopropyl aluminum, where the liquid propylene is fed into a catalyst slurry in toluene. This process produces substantially isotactic macromonomers that do not have a significant amount of amorphous material.

U.S. Pat. No. 6,897,261 discloses olefin graft copolymers obtained by copolymerizing an atactic branched macromonomer, wherein the macromonomer is derived from monomers selected from the group consisting of (1) propylene and (2) the combination of propylene and at least one selected from ethylene, alpha-olefins having from 4 to 20 carbon atoms, cyclic olefins and styrenes, and of which the propylene content falls between 0.1 mol % and 100 mol %, and which macromonomer satisfies the following (a) and (b): (a) its weight-average molecular weight (Mw) measured through gel permeation chromatography (GPC) falls between 400 and 200000; (b) its vinyl content is at least 70 mol % of all the unsaturated groups in the macromonomer, wherein the macromonomer satisfies each of the following (i), (ii), and (iii): (i) the ratio of the temperature dependency ($E_2$) of the macromonomer solution viscosity to the temperature dependency ($E_1$) of the solution viscosity of the linear polymer which has the same type of monomer, the same chemical composition and the same intrinsic viscosity as those of the macromonomer, $E_2/E_1$, satisfies the following relationship: $1.0 < E_2/E_1 < 2.5$.

Rose, et al. (Macromolecules, 41, 2008, pp. 559-567) discloses poly(ethylene-co-propylene) macromonomers not having significant amounts of iso-butyl chain ends. Those were made with bis(phenoxyimine) titanium dichloride (($PHI)_2TiCl_2$) activated with modified methylalumoxane (MMAO; Al/Ti molar ratio range 150 to 292) in semi-batch polymerizations (30 psi propylene added to toluene at 0° C. for 30 min, followed by ethylene gas flow at 32 psi of overpressure at about 0° C. for polymerization times of 2.3 to 4 hours to produce E-P copolymer having an Mn of about 4,800 to 23,300. In four reported copolymerizations, allylic chain ends decreased with increasing ethylene incorporation roughly according to the equation:

% allylic chain ends (of total unsaturations)=−0.95(mol % ethylene incorporated)+100. For example, 65% allyl (compared to total unsaturation) was reported for E-P copolymer containing 29 mol % ethylene. This is the highest allyl population achieved. For 64 mol % incorporated ethylene, only 42% of the unsaturations are allylic. Productivity of these polymerizations ranged from $0.78 \times 10^2$ g/mmol Ti/hr to $4.62 \times 10^2$ g/mmol Ti/hr.

Prior to this work, Zhu, et al. (Macromolecules, 35, 2002, pp. 10062-10070 and Macromolecules Rap. Commun., 24, 2003, pp. 311-315) reported only low (~38%) vinyl terminated ethylene-propylene copolymer made with the constrained geometry metallocene catalyst [$C_5Me_4(SiMe_2N$-tert-butyl)$TiMe_2$ activated with $B(C_6F_5)_3$ and MMAO.

Janiak and Blank summarize a variety of work related to oligomerization of olefins (Macromol. Symp., 236, 2006, pp. 14-22).

U.S. Pat. No. 6,225,432 discloses branched polypropylene compositions which have improved melt strength and good processability. The branched polypropylene compositions have a polydispersity of less than 4.0 and a melt point greater than 90° C. The weight average branching index g of the polypropylene compositions is less than 0.95.

However, processes to make branched polyolefins having high amounts of allyl terminations on a commercial scale are not known. Accordingly, there is a need for new processes that produce allyl terminated branched polyolefins that have allyl termination present in high amounts (50% or more), particularly in high yields and with a wide range of molecular weights, that can be made at commercial rates (5,000 g/mmol/hr productivity or more). There is further a need for branched polyolefin reactive materials having high amounts of allyl termination which can be functionalized and used in additive applications or as blending components.

SUMMARY OF THE INVENTION

The invention relates to processes for polymerization, comprising:
(i) contacting, preferably at a temperature greater than 35° C., one or more monomers comprising ethylene and/or propylene, with a catalyst system comprising a metallocene catalyst compound and an activator, wherein the metallocene catalyst compound is represented by the following formula:

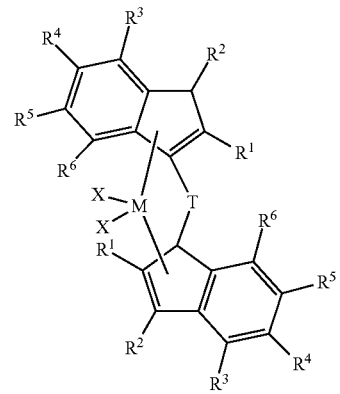

where
M is selected from the group consisting of zirconium or hafnium;
each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system);
each $R^1$, $R^2$, $R^3$, $R^4$, $R^5$, and $R^6$, is, independently, hydrogen or a substituted or unsubstituted hydrocarbyl group, a heteroatom or heteroatom containing group;
further provided that any two adjacent R groups may form a fused ring or multicenter fused ring system where the rings may be aromatic, partially saturated or saturated; and
further provided that any of adjacent $R^4$, $R^5$, and $R^6$ groups may form a fused ring or multicenter fused ring system where the rings may be aromatic, partially saturated or saturated;
T is a bridging group represented by the formula $R_2{}^aJ$, where J is one or more of C, Si, Ge, N, or P, and each $R^a$ is, independently, hydrogen, halogen, $C_1$ to $C_{20}$ hydrocarbyl or a $C_1$ to $C_{20}$ substituted hydrocarbyl,
provided that at least one $R^3$ is a substituted or unsubstituted phenyl group, if any of $R^1$, $R^2$, $R^4$, $R^5$ or $R^6$ are not hydrogen;
(ii) preferably converting at least 50 mol % of the monomer to polyolefin; and
(iii) obtaining a branched polyolefin having greater than 50% allyl chain ends, relative to total unsaturated chain ends and a Tm of 60° C. or more.

This invention also relates to a branched polyolefin having an Mn ($^1$H NMR) of 7,500 to 60,000 g/mol comprising one or more alpha olefin derived units comprising ethylene and/or propylene, and having:
(i) 50% or greater allyl chain ends, relative to total number of unsaturated chain ends; and
(ii) a g'vis of 0.90 or less.

This invention also relates to branched polyolefins having an Mn (GPC) greater than 60,000 g/mol comprising one or more alpha olefins comprising ethylene and/or propylene, and having: (i) 50% or greater allyl chain ends, relative to total unsaturated chain ends; (ii) a g'vis of 0.90 or less; and optionally; and (iii) a bromine number which, upon complete hydrogenation, decreases by at least 50%.

The invention further relates to branched polyolefins having an Mn ($^1$H NMR) of less than 7,500 g/mol comprising one or more alpha olefin derived units comprising ethylene and/or propylene, and having:

(i) a ratio of percentage of saturated chain ends to percentage of allyl chain ends of 1.2 to 2.0; and
(ii) 50% or greater allyl chain ends, relative to total moles of unsaturated chain ends.

BRIEF DESCRIPTION OF THE DRAWINGS

FIG. 1 is a plot of the relationship between g'vis and log Mw for allyl terminated branched polypropylene polymers made with Metallocene A/Activator III (Examples, Table 3, Runs 59-65).

DETAILED DESCRIPTION

The inventors have surprisingly discovered new processes to make branched polyolefins having high amounts of allyl terminations. These new processes can be run under commercial conditions and are capable of producing the branched polyolefins at commercial rates. Furthermore, these processes are typically run using non-coordinating anion activators, preferably bulky activators, as defined below.

Described herein are such processes to produce the branched polyolefins, the branched olefin products, and compositions comprising such branched polyolefins. "Branched" as used herein, means a polyolefin having a g'vis of 0.90 or less, or if the polyolefin has a Mn ($^1$H MNR) of less than 7,500 g/mol, the branched polyolefin has a ratio of saturated chain ends to percentage of allyl chain ends of 1.2 to 2.0. These branched polyolefins having high amounts of allyl chain ends may find utility as macromonomers for the synthesis of branched poly(macromonomers), block copolymers, and as additives, for example, as additives to, or blending agents in, lubricants, waxes, and adhesives. Advantageously, when used as an additive, such as to film compositions, the branched nature of these polyolefins may improve the desired mechanical properties by allowing optimal thermoforming and molding at lower temperatures, thereby reducing energy consumption of the film forming process, as compared to linear polyolefin analogues. Further advantageously, the high amounts of allyl chain ends of these branched polyolefins provides a facile path to functionalization. The functionalized branched polyolefins may be also useful as additives or blending agents.

For the purposes of this invention and the claims thereto, the new numbering scheme for the Periodic Table Groups is used as in CHEMICAL AND ENGINEERING NEWS, 63(5), page 27, (1985). Therefore, a "Group 4 metal" is an element from Group 4 of the Periodic Table.

"Catalyst productivity" is a measure of how many kilograms of polymer (P) are produced using a polymerization catalyst comprising W moles of catalyst (W); and may be expressed in units of kilograms of polymer per mole of catalyst.

Conversion is the amount of monomer that is converted to polymer product, and is reported as mol % and is calculated based on the polymer yield and the amount of monomer fed into the reactor.

Catalyst activity is a measure of how active the catalyst is and is reported as the mass of product polymer (P) produced per kg of catalyst (cat) used (kgP/kgcat).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. The term "polymer," as used herein, includes oligomers (up to 100 mer units), and larger polymers (greater than 100 mer units). A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like.

As used herein, Mn is number average molecular weight (measured by $^1$H NMR, unless stated otherwise), Mw is weight average molecular weight (measured by Gel Permeation Chromatography, GPC), and Mz is z average molecular weight (measured by GPC), wt % is weight percent, mol % is mole percent, vol % is volume percent and mol is mole. Molecular weight distribution (MWD) is defined to be Mw divided by Mn (measured by GPC), Mw/Mn. Unless otherwise noted, all molecular weights (e.g., Mw, Mn, Mz) have units of g/mol. Also, room temperature is 23° C. unless otherwise noted.

Bromine number is determined by ASTM D 1159.

Processes for Making Vinyl Terminated Branched Polyolefins

This invention relates to a process for polymerization, comprising:
(i) contacting, preferably at a temperature greater than 35° C., preferably in the range of from about 35 to 150° C., from 40 to 140° C., from 60 to 140° C., or from 80 to 130° C., one or more monomers comprising ethylene and/or propylene (preferably propylene) and, optionally, one or more $C_4$ to $C_{40}$ alpha olefin monomers (preferably butene, pentene, hexene, heptene, octene, nonene, decene, cyclopentene, cycloheptene, cyclooctene, cyclooctadiene, and isomers thereof), with a catalyst system capable of producing a branched polyolefin having allyl chain ends, the catalyst system comprising a metallocene catalyst compound and an activator, wherein the metallocene catalyst compound is represented by the following formula:

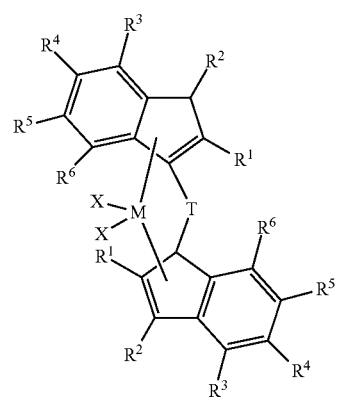

where:
M is selected from the group consisting of zirconium or hafnium (preferably hafnium);

each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system) (preferably X is a halide or a hydrocarbyl radical having from 1 to 20 carbon atoms, preferably X is chloride or methyl);

each $R^1$, $R^2$, $R^3$, $R^4$, $R^5$, and $R^6$, is, independently, hydrogen or a substituted or unsubstituted hydrocarbyl group, a heteroatom or heteroatom containing group;

further provided that any two adjacent R groups may form a fused ring or multicenter fused ring system where the rings may be aromatic, partially saturated or saturated; and further provided that any of adjacent $R^4$, $R^5$, and $R^6$ groups may form a fused ring or multicenter fused ring system where the rings may be aromatic, partially saturated or saturated;

T is a bridging group represented by the formula $R_2{}^aJ$, where J is one or more of C, Si, Ge, N, or P (preferably J is Si), and each $R^a$ is, independently, hydrogen, halogen, $C_1$ to $C_{20}$ hydrocarbyl or a $C_1$ to $C_{20}$ substituted hydrocarbyl (preferably $R^a$ is methyl, ethyl, chloride), provided that at least one $R^3$, preferably both, are a substituted or unsubstituted phenyl group, if any of $R^1$, $R^2$, $R^4$, $R^5$ or $R^6$ are not hydrogen;

(ii) preferably converting at least 50 mol % of the monomer to polyolefin, more preferably at least 60 mol %, at least 70 mol %, at least 80 mol %; and (iii) obtaining a branched polyolefin having greater than 50% allyl chain ends, relative to total unsaturated chain ends (preferably 60% or more, preferably 70% or more, preferably 80% or more, preferably 90% or more, preferably 95% or more) and a Tm of 60° C. or more (preferably 100° C. or more, preferably 120° C. or more).

The inventive processes described herein are run at commercial rates. In some embodiments, the productivity is 4500 g/mmol or more, preferably 5000 g/mmol or more, preferably 10,000 g/mmol or more, preferably 50,000 g/mmol or more. In other embodiments, the productivity is at least 80,000 g/mmol, preferably at least 150,000 g/mmol, preferably at least 200,000 g/mmol, preferably at least 250,000 g/mmol, preferably at least 300,000 g/mmol.

In an alternate embodiment, the activity of the catalyst is at least 10,000 kg polymer per kg catalyst, preferably 50,000 or more kg polymer per kg catalyst, preferably 100,000 or more kg polymer per kg catalyst, preferably 150,000 or more kg polymer per kg catalyst.

In an alternate embodiment, the conversion of olefin monomer is at least 50 mol %, based upon the weight of the monomer entering the reaction zone, preferably 60 mol % or more, preferably 70 mol % or more, preferably 80 mol % or more.

The inventive processes described herein can be run at temperatures and pressures suitable for commercial production of these branched vinyl terminated polymers. Typical temperatures and/or pressures include a temperature greater than 35° C. (preferably in the range of from about 35 to 150° C., from 40 to 140° C., from 60 to 140° C., or from 80 to 130° C.) and a pressure in the range of from about 0.35 to 10 MPa (preferably from 0.45 to 6 MPa or from 0.5 to 4 MPa).

The inventive processes described herein have a residence time suitable for commercial production of these branched vinyl terminated polymers. In a typical polymerization, the residence time of the polymerization process is up to 300 minutes, preferably in the range of from about 1 to 300 minutes, preferably from 5 to 250 minutes, preferably from about 10 to 120 minutes, or preferably from about 10 to 60 minutes.

Suitable diluents/solvents for polymerization include non-coordinating, inert liquids. Examples include straight and branched-chain hydrocarbons such as isobutane, butane, pentane, isopentane, hexanes, isohexane, heptane, octane, dodecane, and mixtures thereof; cyclic and alicyclic hydrocarbons such as cyclohexane, cycloheptane, methylcyclohexane, methylcycloheptane, and mixtures thereof, such as can be found commercially (Isopar™); and perhalogenated hydrocarbons such as perfluorinated $C_{4-10}$ alkanes. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbons are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably at 0.5 wt %, preferably at 0 wt % based upon the weight of the solvents.

In a preferred embodiment, the feed concentration for the polymerization is 60 vol % solvent or less, preferably 40 vol % or less, or preferably 20 vol % or less, preferably 0 vol % based on the total volume of the feedstream. Preferably the polymerization is run in a bulk process.

In some embodiments, where butene is the comonomer, the butene source may be a mixed butene stream comprising various isomers of butene. The 1-butene monomers are expected to be preferentially consumed by the polymerization process. Use of such mixed butene streams will provide an economic benefit, as these mixed streams are often waste streams from refining processes, for example $C_4$ raffinate streams, and can therefore be substantially less expensive than pure 1-butene.

Processes of this invention can be carried out in any manner known in the art. Any suspension, homogeneous bulk, solution, slurry, or gas phase polymerization process known in the art can be used. Such processes can be run in a batch, semi-batch, or continuous mode. Homogeneous polymerization processes and slurry are preferred. (A homogeneous polymerization process is defined to be a process where at least 90 wt % of the product is soluble in the reaction media.) A bulk homogeneous process is particularly preferred. (A bulk process is defined to be a process where monomer concentration in all feeds to the reactor is 70 vol % or more.) Alternately, no solvent or diluent is present or added in the reaction medium, (except for the small amounts used as the carrier for the catalyst system or other additives, or amounts typically found with the monomer; e.g., propane in propylene). Preferably, the process is a single stage polymerization process. In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent). By "continuous mode" is meant that there is continuous addition to, and withdrawal of reactants and products from, the reactor system. Continuous processes can be operated in steady state; i.e., the composition of effluent remains fixed with time if the flow rate, temperature/pressure and feed composition remain invariant. For example, a continuous process to produce a polymer would be one where the reactants are continuously introduced into one or more reactors and polymer product is continuously withdrawn.

In a preferred embodiment hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa). It has been found that in the present systems, hydrogen can be used to provide increased activity without significantly impairing the catalyst's ability to produce allylic chain ends. Preferably the catalyst activity (calculated as g/mmol catalyst/hr) is at least 20% higher than the same reaction without hydrogen present, preferably at least 50% higher, preferably at least 100% higher.

Useful reaction vessels include reactors (including continuous stirred tank reactors, batch reactors, reactive extruder, pipe or pump. A "reaction zone" also referred to as a "polymerization zone" is defined as an area where activated catalysts and monomers are contacted and a polymerization reaction takes place. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization described herein occurs within a single reaction zone. Alternately the polymerization described herein may occur in multiple reaction zones.

In a preferred embodiment hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa). It has been found that in the present systems, hydrogen can be used to provide increased activity without significantly impairing the catalyst's ability to produce allylic chain ends. Preferably the catalyst activity (calculated as g/mmol catalyst/hr) is at least 20% higher than the same reaction without hydrogen present, preferably at least 50% higher, preferably at least 100% higher.

In a preferred embodiment, little or no alumoxane is used in the process to produce the vinyl terminated polymers. Preferably, alumoxane is present at zero mol %, alternately the alumoxane is present at a molar ratio of aluminum to transition metal less than 500:1, preferably less than 300:1, preferably less than 100:1, preferably less than 1:1.

In an alternate embodiment, if an alumoxane is used to produce the vinyl terminated polymers, then the alumoxane has been treated to remove free alkyl aluminum compounds, particularly trimethyl aluminum.

Further, in a preferred embodiment, the activator used herein to produce the vinyl terminated polymer is a bulky activator as defined herein and is discrete.

In a preferred embodiment, little or no scavenger is used in the process to produce the vinyl terminated polymers. Preferably, scavenger (such as tri alkyl aluminum) is present at zero mol %, alternately the scavenger is present at a molar ratio of scavenger metal to transition metal of less than 100:1, preferably less than 50:1, preferably less than 15:1, preferably less than 10:1.

In a preferred embodiment, the polymerization: 1) is conducted at temperatures of 0 to 300° C. (preferably 25 to 150° C., preferably 40 to 120° C., preferably 45 to 80° C.); 2) is conducted at a pressure of atmospheric pressure to 10 MPa (preferably 0.35 to 10 MPa, preferably from 0.45 to 6 MPa, preferably from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are present in the solvent at less than 1 wt %, preferably at 0.5 wt %, preferably at 0 wt % based upon the weight of the solvents); 4) wherein the catalyst system used in the polymerization comprises less than 0.5 mol %, preferably 0 mol % alumoxane, alternately the alumoxane is present at a molar ratio of aluminum to transition metal less than 500:1, preferably less than 300:1, preferably less than 100:1, preferably less than 1:1); 5) the polymerization occurs in one reaction zone; 6) the productivity of the catalyst compound is at least 80,000 g/mmol (preferably at least 150,000 g/mmol, preferably at least 200,000 g/mmol, preferably at least 250,000 g/mmol, preferably at least 300,000 g/mmol); 7) optionally scavengers (such as trialkyl aluminum compounds) are absent (e.g., present at zero mol %, alternately the scavenger is present at a molar ratio of scavenger metal to transition metal of less than 100:1, preferably less than 50:1, preferably less than 15:1, preferably less than 10:1); and 8) optionally hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)). In a preferred embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone. Room temperature is 23° C. unless otherwise noted.

Catalyst Systems

In embodiments herein, the invention relates to processes for making vinyl terminated branched polyolefins at commercial rates and under commercial conditions, wherein the process comprises contacting the monomers in the presence of a catalyst system comprising a metallocene catalyst compound and an activator capable of producing branched polyolefins having 50% or more allyl chain ends. It is within the scope of this invention that the catalyst system is a mixed catalyst system comprising one or more non-metallocene catalyst compounds, one or more metallocene catalyst compounds, or a combination thereof, preferably the mixed catalyst system comprises two or more metallocene catalyst compounds. Preferably, the catalyst system is a single catalyst system. Likewise one, two, or more activators may be used in the catalyst system.

In the description herein, the catalyst may be described as a catalyst precursor, a pre-catalyst compound, a catalyst compound, or a transition metal compound, and these terms are used interchangeably. A polymerization catalyst system is a catalyst system that can polymerize monomers to polymer. A "catalyst system" is a combination of at least one catalyst compound, at least one activator, an optional co-activator, and an optional support material. An "anionic ligand" is a negatively charged ligand which donates one or more pairs of electrons to a metal ion. A "neutral donor ligand" is a neutrally charged ligand which donates one or more pairs of electrons to a metal ion.

For the purposes of this invention and the claims thereto, when catalyst systems are described as comprising neutral stable forms of the components, it is well understood by one of ordinary skill in the art, that the ionic form of the component is the form that reacts with the monomers to produce polymers.

A metallocene catalyst is defined as an organometallic compound with at least one π-bound cyclopentadienyl moiety (or substituted cyclopentadienyl moiety) and more frequently two π-bound cyclopentadienyl-moieties or substituted moieties. This includes other π-bound moieties such as indenyls or fluorenyls or derivatives thereof.

The metallocene, activator, optional co-activator, and optional support components of the particularly useful catalyst systems are discussed below.

(a) Metallocene Catalyst Compound

A "hydrocarbyl" is a radical made of hydrogen and carbon. The term "substituted" means that a hydrogen group has been replaced with a hydrocarbyl group, a heteroatom, or a heteroatom containing group. For example, methyl cyclopentadiene (Cp) is a Cp group substituted with a methyl group, ethyl alcohol is an ethyl group substituted with an —OH group, and a "substituted hydrocarbyl" is a radical made of carbon and hydrogen where at least one hydrogen is replaced by a heteroatom.

For purposes of this invention and claims thereto, "alkoxides" include those where the alkyl group is a $C_1$ to $C_{40}$ hydrocarbyl. The alkyl group may be straight chain, branched, or cyclic. The alkyl group may be saturated or unsaturated. In some embodiments, the alkyl group may comprise at least one aromatic group.

The metallocene catalyst compound of the catalyst system is represented by the formula:

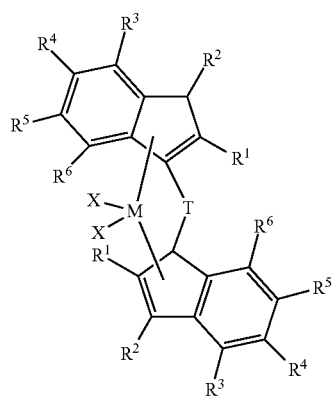

where
M is selected from the group consisting of zirconium or hafnium (preferably hafnium);
each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system) (preferably X is a halide or a hydrocarbyl radical having from 1 to 20 carbon atoms, preferably X is chloride or methyl);
each $R^1$, $R^2$, $R^3$, $R^4$, $R^5$, and $R^6$, is, independently, hydrogen or a substituted or unsubstituted hydrocarbyl group, a heteroatom or heteroatom containing group;
further provided that any two adjacent R groups may form a fused ring or multicenter fused ring system where the rings may be aromatic, partially saturated or saturated;
further provided that any of adjacent $R^4$, $R^5$, and $R^6$ groups may form a fused ring or multicenter fused ring system where the rings may be aromatic, partially saturated or saturated; and
T is a bridging group represented by the formula $R_2^aJ$, where J is one or more of C, Si, Ge, N, or P (preferably J is Si), and each $R^a$ is, independently, hydrogen, halogen, $C_1$ to $C_{20}$ hydrocarbyl or a $C_1$ to $C_{20}$ substituted hydrocarbyl, (preferably $R^a$ is methyl, ethyl, chloride), provided that at least one $R^3$, preferably both, are a substituted or unsubstituted phenyl group, if any of $R^1$, $R^2$, $R^4$, $R^5$ or $R^6$ are not hydrogen;

Particularly preferred $R^a$ substituent groups include a $C_1$ to $C_{20}$ hydrocarbyls, such as methyl, ethyl, propyl (including isopropyl, sec-propyl), butyl (including t-butyl and sec-butyl), neopentyl, cyclopentyl, hexyl, octyl, nonyl, decyl, phenyl, substituted phenyl, benzyl (including substituted benzyl), cyclohexyl, cyclododecyl, norbornyl, and all isomers thereof.

Examples of bridging group $R_2^aT$ useful herein may be represented by R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', and R'$_2$C—PR'—CR'$_2$ where R' is hydrogen or a $C_1$-$C_{20}$ containing hydrocarbyl or substituted hydrocarbyl. Preferably, the bridging group $R_2^aT$ comprises carbon or silica, such as dialkylsilyl, preferably the bridging group is selected from $CH_2$, $CH_2CH_2$, $C(CH_3)_2$, $SiMe_2$, $SiPh_2$, SiMePh, and $(Ph)_2C$.

Catalyst compounds that are particularly useful in this invention include one or more of:
rac-dimethylsilylbis(indenyl)hafnium dimethyl,
rac-dimethylsilylbis(2-methylindenyl)zirconium dimethyl,
rac-dimethylsilyl-bis(5,6,7,8-tetrahydro-5,5,8,8-tetramethyl-2-methyl-1H-benz(f)indene)hafnium dimethyl, and
rac-dimethylsilylbis(2-methyl-4-phenylindenyl)zirconium dimethyl.

In an alternate embodiment, the "dimethyl" after the transition metal in the list of catalyst compounds above is replaced with a dihalide (such as dichloride or difluoride) or a bisphenoxide.

In an alternate embodiment, "hafnium" in the list of catalyst compounds above is replaced with zirconium. In an alternate embodiment, "zirconium" in the list of catalyst compounds above is replaced with hafnium.

(b) Activator

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include ionizing activators, which may be neutral or ionic, and conventional-type cocatalysts. Preferred activators typically include ionizing anion precursor compounds that abstract one reactive, σ-bound, metal ligand making the metal complex cationic and providing a charge-balancing noncoordinating or weakly coordinating anion.

Preferably, little or no alumoxane is used in the process to produce the branched polyolefins. Preferably, alumoxane is present at zero mol %, alternately the alumoxane is present at a molar ratio of aluminum to transition metal less than 500:1, preferably less than 300:1, preferably less than 100:1, preferably less than 1:1. In an alternate embodiment, if an alumoxane is used to produce the branched polyolefins then, the alumoxane has been treated to remove free alkyl aluminum compounds, particularly trimethyl aluminum.

Preferably a non-alumoxane is used as the activator. Further, in a preferred embodiment, the activator used herein to produce the branched polyolefins is bulky as defined herein and is discrete.

Ionizing Activators

It is within the scope of this invention to use an ionizing or stoichiometric activator, neutral or ionic, such as tri (n-butyl) ammonium tetrakis(pentafluorophenyl) borate, a tris perfluorophenyl boron metalloid precursor or a tris perfluoronapthyl boron metalloid precursor, polyhalogenated heteroborane anions (WO 98/43983), boric acid (U.S. Pat. No. 5,942,459) or combination thereof. It is also within the scope of this invention to use neutral or ionic activators alone or in combination with alumoxane or modified alumoxane activators. Much preferred activators are the ionic ones, not the neutral boranes.

Examples of neutral stoichiometric activators include tri-substituted boron, tellurium, aluminum, gallium and indium, or mixtures thereof. The three substituent groups are each independently selected from alkyls, alkenyls, halogens, substituted alkyls, aryls, arylhalides, alkoxy, and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl, or mixtures thereof. Even more preferably, the three groups are halogenated, preferably fluorinated, aryl groups. Most preferably, the neutral stoichiometric activator is tris perfluorophenyl boron or tris perfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP 0 570 982 A; EP 0 520 732 A; EP 0 495 375 A; EP 0 500 944 B1; EP 0 277 003 A; EP 0 277 004 A; U.S. Pat. Nos. 5,153,157; 5,198,401; 5,066,741; 5,206,197; 5,241,025; 5,384,299; 5,502,124; and U.S. patent application Ser. No. 08/285,380, filed Aug. 3, 1994, all of which are herein fully incorporated by reference.

Ionic catalysts can be prepared by reacting a transition metal compound with some neutral Lewis acids, such as $B(C_6F_6)_3$, which upon reaction with the hydrolyzable ligand (X) of the transition metal compound forms an anion, such as $([B(C_6F_5)_3(X)]^-)$, which stabilizes the cationic transition metal species generated by the reaction. The catalysts can be, and preferably are, prepared with activator components which are ionic compounds or compositions.

Compounds useful as an activator component in the preparation of the ionic catalyst systems used in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic, diolefinic and acetylenically unsaturated substrates or other neutral Lewis bases such as ethers, amines and the like. Two classes of compatible non-coordinating anions have been disclosed in EP 0 277,003 A and EP 0 277,004 A published 1988: 1) anionic coordination complexes comprising a plurality of lipophilic radicals covalently coordinated to and shielding a central charge-bearing metal or metalloid core; and 2) anions comprising a plurality of boron atoms such as carboranes, metallacarboranes and boranes.

In a preferred embodiment, the stoichiometric activators include a cation and an anion component, and may be represented by the following formula:

$$(L-H)_d^+(A^{d-}) \qquad (14)$$

wherein L is a neutral Lewis base; H is hydrogen; $(L-H)^+$ is a Bronsted acid; $A^{d-}$ is a non-coordinating anion having the charge d−; and d is 1, 2, or 3.

The cation component, $(L-H)_d^+$ may include Bronsted acids such as protonated Lewis bases capable of protonating a moiety, such as an alkyl or aryl, from the bulky ligand metallocene containing transition metal catalyst precursor, resulting in a cationic transition metal species.

The activating cation $(L-H)_d^+$ may be a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

The anion component $A^{d-}$ include those having the formula $[M^{k+}Q_n]^{d-}$ wherein k is 1, 2, or 3; n is 2, 3, 4, 5, or 6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of boron compounds which may be used as an activating cocatalyst in the preparation of the catalyst system of the processes of this invention are tri-substituted ammonium salts, such as:
trimethylammonium tetraphenylborate, triethylammonium tetraphenylborate, tripropylammonium tetraphenylborate, tri (n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium)tetraphenylborate, tropillium tetraphenylborate, triphenylcarbenium tetraphenylborate, triphenylphosphonium tetraphenylborate triethylsilylium tetraphenylborate, benzene(diazonium)tetraphenylborate, trimethylammonium tetrakis(pentafluorophenyl) borate, triethylammonium tetrakis(pentafluorophenyl) borate, tripropylammonium tetrakis(pentafluorophenyl) borate, tri(n-butyl)ammonium tetrakis(pentafluorophenyl) borate, tri(sec-butyl)ammonium tetrakis(pentafluorophenyl) borate, N,N-dimethylanilinium tetrakis(pentafluorophenyl) borate, N,N-diethylanilinium tetrakis(pentafluorophenyl) borate, N,N-dimethyl-(2,4,6-trimethylanilinium)tetrakis(pentafluorophenyl)borate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium)tetrakis(pentafluorophenyl)borate, trimethylammonium tetrakis-(2,3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluoro-phenyl)borate, dimethyl(t-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium)tetrakis-(2,3,4,6-tetrafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium)tetrakis-(2,3,4,6-tetrafluorophenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(t-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium)tetrakis(3,5-bis(trifluoromethyl)phenyl)borate, tropillium tetrakis(3,5-bis(trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, benzene(diazonium)tetrakis(3,5-bis(trifluoromethyl)phenyl)borate, and dialkyl ammonium salts, such as: di-(i-propyl)ammonium tetrakis(pentafluorophenyl)borate, and dicyclohexylammonium tetrakis(pentafluorophenyl)borate; and additional tri-substituted phosphonium salts, such as tri(o-tolyl)phosphonium tetrakis(pentafluorophenyl)borate, and tri(2,6-dimethylphenyl)phosphonium tetrakis(pentafluorophenyl)borate.

Most preferably, the ionic stoichiometric activator $(L-H)_d^+$ $(A^{d-})$ is, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetrakis(perfluorophenyl)borate.

In one embodiment, an activation method using ionizing ionic compounds not containing an active proton but capable of producing a bulky ligand metallocene catalyst cation and their non-coordinating anion are also contemplated, and are described in EP 0 426 637 A, EP 0 573 403 A, and U.S. Pat. No. 5,387,568, which are all herein incorporated by reference.

The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those that are compatible, stabilize the metallocene cation in the sense of balancing its ionic charge at +1, yet retain sufficient lability to permit displacement by an ethylenically or acetylenically unsaturated monomer during polymerization. In addition to these activator compounds or co-catalysts, scavengers are used such as tri-isobutyl aluminum or tri-octyl aluminum. Preferably, the activator is a non-coordinating anion activator.

Inventive processes also can employ cocatalyst compounds or activator compounds that are initially neutral Lewis acids but form a cationic metal complex and a noncoordinating anion, or a zwitterionic complex upon reaction with the invention compounds. For example, tris(pentafluorophenyl)boron or aluminum act to abstract a hydrocarbyl or hydride ligand to yield an invention cationic metal complex and stabilizing noncoordinating anion, see EP 0 427 697 A and EP 0 520 732 A for illustrations of analogous Group-4 metallocene compounds. Also, see the methods and compounds of EP 0 495 375 A. For formation of zwitterionic complexes using analogous Group 4 compounds, see U.S. Pat. Nos. 5,624,878; 5,486,632; and 5,527,929.

Another suitable ion forming, activating cocatalyst comprises a salt of a cationic oxidizing agent and a noncoordinating, compatible anion represented by the formula:

$$(OX^{e+})_d(A^{d-})_e \qquad (16)$$

wherein $OX^{e+}$ is a cationic oxidizing agent having a charge of e+; e is 1, 2, or 3; and $A^{d-}$ is a non-coordinating anion having the charge d−; and d is 1 2, or 3. Examples of cationic oxidizing agents include: ferrocenium, hydrocarbyl-substituted ferrocenium, $Ag^+$ or $Pb^{+2}$. Preferred embodiments of $A^{d-}$ are those anions previously defined with respect to the Bronsted acid containing activators, especially tetrakis(pentafluorophenyl)borate.

The typical NCA (or non-alumoxane activator) activator-to-catalyst ratio is a 1:1 molar ratio. Alternate preferred ranges include from 0.1:1 to 100:1, alternately from 0.5:1 to 200:1, alternately from 1:1 to 500:1, alternately from 1:1 to 1000:1. A particularly useful range is from 0.5:1 to 10:1, preferably 1:1 to 5:1.

Bulky Activators

The inventors have surprisingly found that bulky activators are particularly useful. Bulky activators can advantageously produce higher Mw, higher Tm, and/or a greater amount of allyl chain ends than the same catalyst with a non-bulky activator, under the same polymerization conditions.

"Bulky activator" as used herein refers to anionic activators represented by the formula:

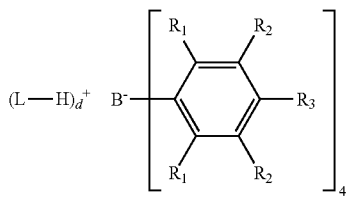

where
each $R_1$ is, independently, a halide, preferably a fluoride;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group);
each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring);
L is an neutral Lewis base;
$(L-H)^+$ is a Bronsted acid;
d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
| --- | --- |
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

Exemplary bulky substituents of activators suitable herein and their respective scaled volumes and molecular volumes are shown in the table below. The dashed bonds indicate binding to boron, as in the general formula above.

| Activator | Structure of boron substituents | Molecular Formula of each substituent | $V_S$ | MV (Å$^3$) | Total MV (Å$^3$) |
| --- | --- | --- | --- | --- | --- |
| Dimethylanilinium tetrakis(perfluoronaphthyl) borate | | $C_{10}F_7$ | 34 | 261 | 1044 |
| Dimethylanilinium tetrakis(perfluorobiphenyl) borate | | $C_{12}F_9$ | 42 | 349 | 1396 |

| Activator | Structure of boron substituents | Molecular Formula of each substituent | $V_S$ | MV (Å³) | Total MV (Å³) |
|---|---|---|---|---|---|
| [4-tButyl-PhNMe$_2$H] [(C$_6$F$_3$(C$_6$F$_5$)$_2$)$_4$B] | (perfluorinated terphenyl structure) | C$_{18}$F$_{13}$ | 62 | 515 | 2060 |

Exemplary bulky activators useful in catalyst systems herein include: trimethylammonium tetrakis(perfluoronaphthyl)borate, triethylammonium tetrakis(perfluoronaphthyl) borate, tripropylammonium tetrakis(perfluoronaphthyl)borate, tri(n-butyl)ammonium tetrakis(perfluoronaphthyl) borate, tri(t-butyl)ammonium tetrakis(perfluoronaphthyl) borate, N,N-dimethylanilinium tetrakis(perfluoronaphthyl) borate, N,N-diethylanilinium tetrakis(perfluoronaphthyl) borate, N,N-dimethyl-(2,4,6-trimethylanilinium)tetrakis (perfluoronaphthyl)borate, tropillium tetrakis (perfluoronaphthyl)borate, triphenylcarbenium tetrakis (perfluoronaphthyl)borate, triphenylphosphonium tetrakis (perfluoronaphthyl)borate, triethylsilylium tetrakis (perfluoronaphthyl)borate, benzene(diazonium)tetrakis (perfluoronaphthyl)borate, trimethylammonium tetrakis (perfluorobiphenyl)borate, triethylammonium tetrakis (perfluorobiphenyl)borate, tripropylammonium tetrakis (perfluorobiphenyl)borate, tri(n-butyl)ammonium tetrakis (perfluorobiphenyl)borate, tri(t-butyl)ammonium tetrakis (perfluorobiphenyl)borate, N,N-dimethylanilinium tetrakis (perfluorobiphenyl)borate, N,N-diethylanilinium tetrakis (perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis (perfluorobiphenyl)borate, [4-t-butyl-PhNMe$_2$H][(C$_6$F$_3$ (C$_6$F$_5$)$_2$)$_4$B], and the types disclosed in U.S. Pat. No. 7,297,653.

It is within the scope of this invention that catalyst compounds can be combined with one or more activators or activation methods described above.

(iii) Optional Co-Activators and Scavengers

In addition to these activator compounds, scavengers or co-activators may be used. Aluminum alkyl or organoaluminum compounds which may be utilized as co-activators (or scavengers) include, for example, trimethylaluminum, triethylaluminum, triisobutylaluminum, tri-n-hexylaluminum, and tri-n-octylaluminum.

(iv) Optional Support Materials

In embodiments herein, the catalyst system may comprise an inert support material. Preferably, the supported material is a porous support material, for example, talc, and inorganic oxides. Other support materials include zeolites, clays, organoclays, or any other organic or inorganic support material, and the like, or mixtures thereof.

Preferably, the support material is an inorganic oxide in a finely divided form. Suitable inorganic oxide materials for use in metallocene catalyst systems herein include Groups 2, 4, 13, and 14 metal oxides such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania and the like. Preferred support materials include Al$_2$O$_3$, ZrO$_2$, SiO$_2$, and combinations thereof, more preferably SiO$_2$, Al$_2$O$_3$, or SiO$_2$/Al$_2$O$_3$.

It is preferred that the support material, most preferably an inorganic oxide, has a surface area in the range of from about 10 to about 700 m$^2$/g, pore volume in the range of from about 0.1 to about 4.0 cc/g and average particle size in the range of from about 5 to about 500 μm. More preferably, the surface area of the support material is in the range of from about 50 to about 500 m$^2$/g, pore volume of from about 0.5 to about 3.5 cc/g and average particle size of from about 10 to about 200 μm. Most preferably the surface area of the support material is in the range of from about 100 to about 400 m$^2$/g, pore volume from about 0.8 to about 3.0 cc/g and average particle size is from about 5 to about 100 μm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 m$^2$/gm; pore volume of 1.65 cm$^3$/gm), examples of which are marketed under the tradenames of DAVISON 952 or DAVISON 955 by the Davison Chemical Division of W.R. Grace and Company. In other embodiments, DAVISON 948 is used.

The support material should be dry, that is, free of absorbed water. Drying of the support material can be effected by heating or calcining at about 100° C. to about 1000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material must have at least some reactive hydroxyl (OH) groups to produce the catalyst system of this invention. The calcined support material is then contacted with at least one polymerization catalyst comprising at least one metallocene compound and an activator.

Methods of Making the Supported Catalyst Systems

The support material, having reactive surface groups, typically hydroxyl groups, is slurried in a non-polar solvent and the resulting slurry is contacted with a solution of a metallocene compound and an activator. The slurry of the support material in the solvent is prepared by introducing the support material into the solvent, and heating the mixture to about 0 to about 70° C., preferably to about 25 to about 60° C., preferably at room temperature. Contact times typically range from about 0.5 hours to about 24 hours, from about 0.5 hours to about 8 hours, or from about 0.5 hours to about 4 hours.

Suitable non-polar solvents are materials in which all of the reactants used herein, i.e., the activator, and the metallocene compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene and ethylbenzene, may also be employed.

In embodiments herein, the support material is contacted with a solution of a metallocene compound and an activator, such that the reactive groups on the support material are titrated, to form a supported polymerization catalyst. The period of time for contact between the metallocene compound, the activator, and the support material is as long as is necessary to titrate the reactive groups on the support material. To "titrate" is meant to react with available reactive groups on the surface of the support material, thereby reducing the surface hydroxyl groups by at least 80%, at least 90%, at least 95%, or at least 98%. The surface reactive group concentration may be determined based on the calcining temperature and the type of support material used. The support material calcining temperature affects the number of surface reactive groups on the support material available to react with the metallocene compound and an activator: the higher the drying temperature, the lower the number of sites. For example, where the support material is silica which, prior to the use thereof in the first catalyst system synthesis step, is dehydrated by fluidizing it with nitrogen and heating at about 600° C. for about 16 hours, a surface hydroxyl group concentration of about 0.7 millimoles per gram (mmols/gm) is typically achieved. Thus, the exact molar ratio of the activator to the surface reactive groups on the carrier will vary. Preferably, this is determined on a case-by-case basis to assure that only so much of the activator is added to the solution as will be deposited onto the support material without leaving excess of the activator in the solution.

The amount of the activator which will be deposited onto the support material without leaving excess in the solution can be determined in any conventional manner, e.g., by adding the activator to the slurry of the carrier in the solvent, while stirring the slurry, until the activator is detected as a solution in the solvent by any technique known in the art, such as by $^1$H NMR. For example, for the silica support material heated at about 600° C., the amount of the activator added to the slurry is such that the molar ratio of B to the hydroxyl groups (OH) on the silica is about 0.5:1 to about 4:1, preferably about 0.8:1 to about 3:1, more preferably about 0.9:1 to about 2:1 and most preferably about 1:1. The amount of boron on the silica may be determined by using ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, Eds., Butterworth-Heinemann, Boston, Mass., 1992, pp. 633-644. In another embodiment, it is also possible to add such an amount of activator which is in excess of that which will be deposited onto the support, and then remove, e.g., by filtration and washing, any excess of the activator.

Vinyl Terminated Branched Polyolefins

Embodiments herein relate to branched polyolefins having allyl chain ends of 50% or more. The inventors have surprisingly found that the processes disclosed herein give rise to an increased population of long chain branched products, possibly through vinyl macromonomer re-incorporation. Without wishing to be bound by theory, the inventors opine that the branching is likely of the "T" variety, and these branched polyolefins retain high amounts of allyl chain ends.

The branched polyolefins having 50% or more allyl chain ends produced by the processes disclosed herein is:

(a) branched, having at least one of:
  (i) a branching index (g'vis) of less than 0.90 (preferably 0.85 or less, preferably 0.80 or less); or
  (ii) a ratio of percentage of saturated chain ends (preferably isobutyl chain ends) to percentage of allyl chain ends of 1.2 to 2.0 (preferably 1.6 to 1.8), wherein the percentage of saturated chain ends is determined using $^{13}$C NMR as described in WO 2009/155471 at paragraph [0095] and [0096] except that the spectra are referenced to the chemical shift of the solvent, tetrachloroethane-d$_2$; or
  (iii) a ratio of Mn(GPC)/Mn($^1$H NMR) of 0.95 or less (preferably 0.90 or less, preferably 0.85 or less, preferably 0.80 or less); and (b) has at least 50% allyl chain ends, relative to total unsaturated chain ends (preferably 60% or more, preferably 70% or more, preferably 75% or more, preferably 80% or more, preferably 90% or more, preferably 95% or more) and having at least one of:
  (i) a bromine number which, upon complete hydrogenation, decreases by at least 50% (preferably at least 75%); or
  (ii) an allyl chain end to internal vinylidene ratio of greater than 5:1 (preferably greater than 10:1); or
  (iii) an allyl chain end to vinylidene chain end ratio of greater than 10:1 (preferably greater than 15:1), or
  (iv) an allyl chain end to vinylene chain end ratio of greater than 1:1 (preferably greater than 2:1, greater than 5:1, or greater than 10:1).

With respect to branching, in embodiments where the branched polyolefins have an Mn (measured by $^1$H NMR) of 7,500 to 60,000 g/mol, the branched polyolefin has:
(i) a branching index (g'vis) of less than 0.90 (preferably less than 0.85, less than 0.80, or less than 0.75); and/or
(ii) a ratio of percentage of saturated chain ends (preferably isobutyl chain ends) to percentage of allyl chain ends of 1.2 to 2.0 (preferably 1.6 to 1.8), wherein the percentage of saturated chain ends is determined using $^{13}$C NMR as described in WO 2009/155471 at paragraph [0095] and [0096] except that the spectra are referenced to the chemical shift of the solvent, tetrachloroethane-d$_2$; and/or
(iii) a ratio of Mn(GPC)/Mn($^1$H NMR) of 0.95 or less (preferably 0.90 or less, preferably 0.85 or less, preferably 0.80 or less). In the event of conflict, g'vis shall be used (if g'vis cannot be determined, then the ratio of percentage of saturated chain ends to percentage of allyl chain ends shall be used; if the ratio of percentage of saturated chain ends to percentage of allyl chain ends cannot be determined, then the ratio of Mn(GPC)/Mn($^1$H NMR) shall be used).

In embodiments where the branched polyolefins have an Mn (measured by GPC) of greater than 60,000 g/mol, the branched polyolefin has a g'vis of less than 0.90 (preferably 0.85 or less, preferably 0.80 or less) and, optionally, a bromine number which, upon complete hydrogenation, decreases by at least 50% (preferably by at least 75%).

In embodiments where the branched polyolefins have an Mn (measured by $^1$H NMR) of less than 7,500 g/mol (preferably from 100 to 7,500 g/mol), comprise one or more alpha olefins (preferably propylene and/or ethylene, preferably propylene) and, optionally, a $C_4$ to $C_{40}$ alpha olefin (preferably a $C_4$ to $C_{20}$ alpha olefin, preferably a $C_4$ to $C_{12}$ alpha olefin, preferably butene, pentene, hexene, heptene, octene, nonene, decene, cyclopentene, cycloheptene, cyclooctene, cyclooctadiene, and isomers thereof), and have:
(i) a ratio of percentage of saturated chain ends (preferably isobutyl chain ends) to percentage of allyl chain ends of 1.2 to 2.0 (preferably 1.6 to 1.8), wherein the percentage of saturated chain ends is determined using $^{13}$C NMR as described in WO 2009/155471 at paragraph [0095] and [0096] except that the spectra are referenced to the chemical shift of the solvent, tetrachloroethane-$d_2$; and/or
(ii) a ratio of Mn(GPC)/Mn($^1$H NMR) of 0.95 or less (preferably 0.90 or less, preferably 0.85 or less, preferably 0.80 or less).

In an alternate embodiment, the branched polyolefins having an Mn (measured by $^1$H NMR) of less than 7,500 g/mol (preferably from 100 to 7,500 g/mol) has a g'vis of 0.90 or less (preferably 0.85 or less, preferably 0.80 or less).

In one embodiment, the branched polyolefins produced herein have an Mn (measured by $^1$H NMR) of 7,500 to 60,000 g/mol, comprise one or more alpha olefins (preferably propylene and/or ethylene, preferably propylene) and, optionally, a $C_4$ to $C_{40}$ alpha olefin (preferably a $C_4$ to $C_{20}$ alpha olefin, preferably a $C_4$ to $C_{12}$ alpha olefin, preferably butene, pentene, hexene, heptene, octene, nonene, decene, cyclopentene, cycloheptene, cyclooctene, cyclooctadiene, and isomers thereof), and have:
(i) 50% or greater allyl chain ends, relative to total unsaturated chain ends (preferably 60% or more, preferably 70% or more, preferably 75% or more, preferably 80% or more, preferably 90% or more, preferably 95% or more);
(ii) a g'vis of 0.90 or less (preferably 0.85 or less, preferably 0.80 or less); and/or a ratio of percentage of saturated chain ends (preferably isobutyl chain ends) to percentage of allyl chain ends of 1.2 to 2.0 (preferably 1.6 to 1.8), wherein the percentage of saturated chain ends is determined using $^{13}$C NMR as described in WO 2009/155471 at paragraph [0095] and [0096] except that the spectra are referenced to the chemical shift of the solvent, tetrachloroethane-$d_2$, and/or a ratio of Mn(GPC)/Mn($^1$H NMR) of 0.95 or less (preferably 0.90 or less, preferably 0.85 or less, preferably 0.80 or less);
(iii) optionally, a peak melting point (Tm) of greater than 60° C. (preferably greater than 100° C., preferably from 60 to 180° C., preferably from 80 to 175° C.);
(iv) optionally, a heat of fusion (Hf) of greater than 7 J/g (preferably greater than 15 J/g, greater than 30 J/g, greater than 50 J/g, greater than 60 J/g, or greater than 80 J/g);
(v) optionally, an allyl chain end to internal vinylidene ratio of greater than 5:1 (preferably greater than 10:1);
(vi) optionally, an allyl chain end to vinylidene chain end ratio of greater than 10:1 (preferably greater than 15:1); and
(vii) optionally, an allyl chain end to vinylene chain end ratio of greater than 1:1 (preferably greater than 2:1, greater than 5:1, or greater than 10:1).

In another embodiment, the branched polyolefins produced herein have an Mn (measured by GPC) of greater than 60,000 g/mol, comprise one or more alpha olefins (preferably propylene and/or ethylene, preferably propylene) and optionally, a $C_4$ to $C_{40}$ alpha olefin (preferably a $C_4$ to $C_{20}$ alpha olefin, preferably a $C_4$ to $C_{12}$ alpha olefin, preferably butene, pentene, hexene, heptene, octene, nonene, decene, cyclopentene, cycloheptene, cyclooctene, cyclooctadiene, and isomers thereof) and have:
(i) 50% or greater allyl chain ends, relative to total unsaturated chain ends (preferably 60% or more, preferably 70% or more, preferably 75% or more, preferably 80% or more, preferably 90% or more, preferably 95% or more);
(ii) a g'vis of 0.90 or less (preferably 0.85 or less, preferably 0.80 or less);
(iii) optionally, a bromine number which, upon complete hydrogenation, decreases by at least 50% (preferably at least 75%);
(iv) optionally, a Tm of greater than 60° C. (preferably greater than 100° C., preferably from 60 to 180° C., preferably from 80 to 175° C.); and
(v) optionally, an Hf of greater than 7 J/g (preferably greater than 15 J/g, greater than 30 J/g, greater than 50 J/g, greater than 60 J/g, or greater than 80 J/g).

In another embodiment, the branched polyolefins produced herein have an Mn (measured by $^1$H NMR) of less than 7,500 g/mol (preferably from 100 to 7,500 g/mol), comprise one or more alpha olefins (preferably propylene and/or ethylene, preferably propylene) and, optionally, a $C_4$ to $C_{40}$ alpha olefin (preferably a $C_4$ to $C_{20}$ alpha olefin, preferably a $C_4$ to $C_{12}$ alpha olefin, preferably butene, pentene, hexene, heptene, octene, nonene, decene, cyclopentene, cycloheptene, cyclooctene, cyclooctadiene, and isomers thereof) and have:
(i) 50% or greater allyl chain ends, relative to total number of unsaturated chain ends (preferably 60% or more, preferably 70% or more, preferably 75% or more, preferably 80% or more, preferably 90% or more, preferably 95% or more);
(ii) a ratio of percentage of saturated chain ends (preferably isobutyl chain ends) to percentage of allyl chain ends of 1.2 to 2.0 (preferably 1.6 to 1.8), wherein the percentage of saturated chain ends is determined using $^{13}$C NMR as described in WO 2009/155471 at paragraph [0095] and [0096] except that the spectra are referenced to the chemical shift of the solvent, tetrachloroethane-$d_2$, and/or a ratio of Mn(GPC)/Mn($^1$H NMR) of 0.95 or less (preferably 0.90 or less, preferably 0.85 or less, preferably 0.80 or less);
(iii) optionally, a Tm of greater than 60° C. (preferably greater than 100° C., preferably from 60 to 180° C., preferably from 80 to 175° C.);
(iv) optionally, an Hf of greater than 7 J/g (preferably greater than 15 J/g, greater than 30 J/g, greater than 50 J/g, greater than 60 J/g, or greater than 80 J/g);
(v) optionally, an allyl chain end to internal vinylidene ratio of greater than 5:1 (preferably greater than 10:1);
(vi) optionally, an allyl chain end to vinylidene chain end ratio of greater than 10:1 (preferably greater than 15:1); and
(vii) optionally, an allyl chain end to vinylene chain end ratio of greater than 1:1 (preferably greater than 2:1, greater than 5:1, or greater than 10:1).

In some embodiments, the branched polyolefins have a branching index, g'vis (as determined by GPC), of 0.90 or less (preferably 0.85 or less, preferably 0.80 or less), relative to a linear polymer of the same composition and microstructure.

The preferred branched polyolefins described herein have an Mn (measured by $^1$H NMR) of 7,500 to 60,000 g/mol or alternately greater than 60,000 g/mol or alternately from 100 g/mol to less than 7,500 g/mol. Further, a desirable molecular weight range can be any combination of any upper molecular weight limit with any lower molecular weight limit described above. Mn ($^1$H NMR) is determined according to the NMR method described below in the Examples section. Mn may also be determined using a GPC-DRI method, as described below. For the purpose of the claims, unless indicated otherwise, Mn is determined by $^1$H NMR.

In another embodiment, the branched polyolefins described herein have an Mw (measured using a GPC-DRI method, as described below) of 1000 g/mol or more (preferably from about 1,000 to about 400,000 g/mol, preferably from about 2000 to 300,000 g/mol, preferably from about 3,000 to 200,000 g/mol) and/or an Mz in the range of from about 1700 to about 150,000 g/mol or preferably from about 800 to 100,000 g/mol, and/or an Mw/Mn in the range of from about 1.2 to 20 (alternately from about 1.7 to 10, alternately from about 1.8 to 5.5).

In particular embodiments, the branched polyolefins described herein have a ratio of Mn(GPC)/Mn($^1$H NMR) of 0.95 or less (preferably 0.90 or less, preferably 0.85 or less, preferably 0.80 or less). With respect to FIG. 1, FIG. 1 shows a plot of Mn as determined by GPC versus Mn calculated from $^1$H NMR data, as shown below. The plot of the best fit line for the experimental data (shown as a solid line) lies below the parity plot (dashed line). The slope of the best fit line is 0.73065.

Mn is calculated from $^1$H NMR data, assuming one unsaturation per polyolefin chain. $^1$H NMR data is collected at either room temperature or 120° C. (for purposes of the claims, 120° C. shall be used) in a 5 mm probe using a Varian spectrometer with a proton frequency of 250 MHz, 400 MHz, or 500 MHz (for the purpose of the claims, a proton frequency of 400 mHz is used). Data is recorded using a maximum pulse width of 45° C., 8 seconds between pulses and signal averaging 120 transients. Spectral signals are integrated and the number of unsaturation types per 1000 carbons is calculated by multiplying the different unsaturation groups by 1000 and dividing the result by the total number of carbons. Mn ($^1$H NMR) is calculated by dividing the total number of unsaturated species into 14,000, and has units of g/mol.

Mn, Mw, Mz, carbon number, and g'vis are measured by a GPC-DRI (Gel Permeation Chromatograph-Differential Refractive Index) method using a High Temperature Size Exclusion Chromatograph (SEC, either from Waters Corporation or Polymer Laboratories), equipped with a DRI. Experimental details, are described in: T. Sun, P. Brant, R. R. Chance, and W. W. Graessley, Macromolecules, Volume 34, Number 19, pp. 6812-6820, (2001) and references therein. Three Polymer Laboratories PLgel 10 mm Mixed-B columns are used. The nominal flow rate is 0.5 cm$^3$/min, and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of Aldrich reagent grade 1,2,4-trichlorobenzene (TCB). The TCB mixture is then filtered through a 0.7 μm glass pre-filter and subsequently through a 0.1 μm Teflon filter. The TCB is then degassed with an online degasser before entering the SEC. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/mL at room temperature and 1.324 g/mL at 135° C. The injection concentration is from 1.0 to 2.0 mg/mL, with lower concentrations being used for higher molecular weight samples. Prior to running each sample the DRI detector and the injector are purged. Flow rate in the apparatus is then increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 135° C. and λ=690 nm. For purposes of this invention and the claims thereto (dn/dc)=0.104 for propylene polymers and 0.1 otherwise. Units of parameters used throughout this description of the SEC method are: concentration is expressed in g/cm$^3$, molecular weight is expressed in g/mol, and intrinsic viscosity is expressed in dL/g.

The LS detector is a Wyatt Technology High Temperature mini-DAWN. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient [for purposes of this invention, $A_2$=0.0006 for propylene polymers, 0.0015 for butene polymers and 0.001 otherwise], (dn/dc)=0.104 for propylene polymers, 0.098 for butene polymers and 0.1 otherwise, P(θ) is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=690 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index g'vis is defined as:

$$g'vis = \frac{[\eta]_{avg}}{kM_v^\alpha}$$

where, for purpose of this invention and claims thereto, $\alpha$=0.695 and k=0.000579 for linear ethylene polymers, $\alpha$=0.705 k=0.000262 for linear propylene polymers, and $\alpha$=0.695 and k=0.000181 for linear butene polymers. $M_v$ is the viscosity-average molecular weight based on molecular weights determined by LS analysis. See Macromolecules, 2001, 34, pp. 6812-6820 and Macromolecules, 2005, 38, pp. 7181-7183, for guidance on selecting a linear standard having similar molecular weight and comonomer content, and determining k coefficients and $\alpha$ exponents.

In some embodiments, the branched polyolefin has 50% or greater allyl chain ends (preferably 60% or more, preferably 70% or more, preferably 80% or more, preferably 90% or more, preferably 95% or more). Branched polyolefins generally have a chain end (or terminus) which is saturated and/or an unsaturated chain end. The unsaturated chain end of the inventive polymers comprises "allyl chain ends." An allyl chain end is represented by the formula:

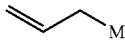

where M represents the polymer chain. "Allylic vinyl group," "allyl chain end," "vinyl chain end," "vinyl termination," "allylic vinyl group" and "vinyl terminated" are used interchangeably in the following description.

The "allyl chain end to vinylidene chain end ratio" is defined to be the ratio of the percentage of allyl chain ends to the percentage of vinylidene chain ends. In some embodiments, the allyl chain end to vinylidene chain end ratio is more than 10:1 (preferably greater than 15:1).

The "allyl chain end to vinylene chain end ratio" is defined to be the ratio of the percentage of allyl chain ends to the percentage of vinylene chain ends. In some embodiments, the allyl chain end to vinylene chain end ratio is greater than 1:1 (preferably greater than 2:1, greater than 5:1, or greater than 10:1).

The "allyl chain end to internal vinylidene ratio" is defined to be the ratio of the percentage of allyl chain ends to the percentage of internal (or non-terminal) vinylidene groups. In some embodiments, the allyl chain end to internal vinylidene ratio is greater than 5:1 (preferably greater than 10:1).

The number of allyl chain ends, vinylidene chain ends and vinylene chain ends is determined using $^1$H NMR at 120° C. using deuterated tetrachloroethane as the solvent on an at least 250 MHz NMR spectrometer, and in selected cases, confirmed by $^{13}$C NMR. Resconi has reported proton and carbon assignments (neat perdeuterated tetrachloroethane used for proton spectra, while a 50:50 mixture of normal and perdeuterated tetrachloroethane was used for carbon spectra; all spectra were recorded at 100° C. on a Bruker spectrometer operating at 500 MHz for proton and 125 MHz for carbon) for vinyl terminated propylene oligomers in J. American Chemical Soc., 114, 1992, pp. 1025-1032 that are useful herein. Allyl chain ends are reported as a molar percentage of the total number of moles of unsaturated groups (that is, the sum of allyl chain ends, vinylidene chain ends, vinylene chain ends, and the like).

The unsaturated chain ends may be further characterized by using bromine electrometric titration, as described in ASTM D 1159. The bromine number obtained is useful as a measure of the unsaturation present in the sample. In embodiments herein, branched polyolefins have a bromine number which, upon complete hydrogenation, decreases by at least 50% (preferably by at least 75%).

The branched polyolefin also has at least one saturated chain end, preferably at least two saturated chain ends, per branched polyolefin molecule. In some embodiments, the branched polyolefins produced herein have a ratio of percentage of saturated chain ends (preferably isobutyl chain ends) to percentage of allyl chain ends of 1.2 to 2.0 (preferably 1.6 to 1.8), wherein the percentage of saturated chain ends is determined using $^{13}$C NMR as described in WO 2009/155471 at paragraph [0095] and [0096] except that the spectra are referenced to the chemical shift of the solvent, tetrachloroethane-$d_2$. Where the branched polyolefins comprise propylene-derived units, the saturated chain end which may comprise an isobutyl chain end. An "isobutyl chain end" is defined to be an end or terminus of a polymer, represented as shown in the formula below:

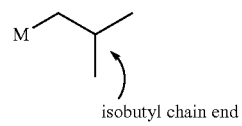

isobutyl chain end where M represents the polymer chain. The structure of the branched polyolefin near the saturated chain end may differ, depending on the types and amounts of monomer(s) used, and method of insertion during the polymerization process. In some preferred embodiments, where the branched polyolefins comprise propylene-derived units and $C_4$ to $C_{40}$ alpha olefin derived units, the structure of the polymer within four carbons of the isobutyl chain end is represented by one of the following formulae:

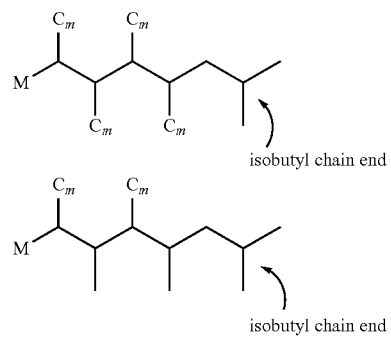

isobutyl chain end isobutyl chain end

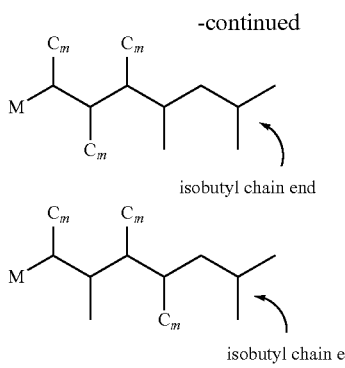

isobutyl chain end isobutyl chain end where M represents the rest of the polymer chain and $C_m$ represents the polymerized monomer, each $C_m$ may be the same or different, and where m is an integer from 2 to 8.

The percentage of isobutyl chain ends is determined using $^{13}C$ NMR (as described in the Example section) and the chemical shift assignments in Resconi et al, J. Am. Chem. Soc. 114, 1992, pp. 1025-1032 for 100% propylene oligomers and reported herein for branched polyolefins.

In some embodiments, the branched polyolefin has a ratio of percentage of saturated chain ends (preferably isobutyl chain ends) to percentage of allyl chain ends of 1.2 to 2.0 (preferably 1.6 to 1.8), wherein the percentage of saturated chain ends is determined using $^{13}C$ NMR as described in WO 2009/155471 at paragraph [0095] and [0096] except that the spectra are referenced to the chemical shift of the solvent, tetrachloroethane-$d_2$.

In other embodiments, the branched polyolefins described herein have a Tm of greater than 60° C. (preferably greater than 100° C., preferably from 60 to 180° C., preferably from 80 to 175° C.).

In other embodiments, the branched polyolefins described herein have an Hf of greater than 7 J/g (preferably greater than 15 J/g, greater than 30 J/g, greater than 50 J/g, greater than 60 J/g, or greater than 80 J/g).

In other embodiments, the branched polyolefins described herein have a glass transition temperature (Tg) of less than 0° C. or less (as determined by differential scanning calorimetry as described below), preferably −10° C. or less, more preferably −20° C. or less, more preferably −30° C. or less, more preferably −50° C. or less.

Tm, Hf, and Tg are measured using Differential Scanning Calorimetry (DSC) using commercially available equipment such as a TA Instruments Model Q100. Typically, 6 to 10 mg of the sample, that has been stored at room temperature for at least 48 hours, is sealed in an aluminum pan and loaded into the instrument at room temperature. The sample is equilibrated at 25° C., then it is cooled at a cooling rate of 10° C./min to −80° C. The sample is held at −80° C. for 5 min and then heated at a heating rate of 10° C./min to 25° C. The glass transition temperature is measured from the heating cycle. Alternatively, the sample is equilibrated at 25° C. for 5 minutes, then heated at a heating rate of 10° C./min to 200° C., followed by an equilibration at 200° C. for 5 minutes, and cooled at 10° C./min to −80° C. The endothermic melting transition, if present, is analyzed for onset of transition and peak temperature. The melting temperatures reported are the peak melting temperatures from the first heat unless otherwise specified. For samples displaying multiple peaks, the melting point (or melting temperature) is defined to be the peak melting temperature associated with the largest endothermic calorimetric response in that range of temperatures from the DSC melting trace. Areas under the DSC curve are used to determine the heat of transition (heat of fusion, Hf, upon melting or heat of crystallization, Hc, upon crystallization, if the Hf value from the melting is different from the Hc value obtained for the heat of crystallization, then the value from the melting (Tm) shall be used), which can be used to calculate the degree of crystallinity (also called the percent crystallinity). The percent crystallinity (X %) is calculated using the formula: [area under the curve (in J/g)/H° (in J/g)]*100, where H° is the heat of fusion for the homopolymer of the major monomer component. These values for H° are to be obtained from the Polymer Handbook, Fourth Edition, published by John Wiley and Sons, New York 1999, except that a value of 290 J/g is used as the equilibrium heat of fusion (H°) for 100% crystalline polyethylene, a value of 140 J/g is used as the equilibrium heat of fusion (H°) for 100% crystalline polybutene, and a value of 207 J/g (H°) is used as the heat of fusion for a 100% crystalline polypropylene.

In another embodiment, any of the branched polyolefins described herein have a viscosity at 190° C. of greater than 50 mPa·sec, greater than 100 mPa·sec, or greater than 500 mPa·sec. In other embodiments, the branched polyolefins have a viscosity of less than 15,000 mPa·sec, or less than 10,000 mPa·sec. Viscosity is defined herein as resistance to flow and is measured at an elevated temperature using a Brookfield Viscometer according to ASTM D-3236.

In a preferred embodiment, any of the branched polyolefins described herein comprises less than 3 wt % of functional groups selected from hydroxide, aryls and substituted aryls, halogens, alkoxys, carboxylates, esters, acrylates, oxygen, nitrogen, and carboxyl (preferably less than 2 wt %, less than 1 wt %, less than 0.5 wt %, less than 0.1 wt %, or 0 wt %), based upon the weight of the copolymer.

In another embodiment, any of the branched polyolefins described herein comprises at least 50 wt % (preferably at least 75 wt %, preferably at least 90 wt %), based upon the weight of the copolymer composition, of olefins having at least 36 carbon atoms (preferably at least 51 carbon atoms or at least 102 carbon atoms) as measured by $^1H$ NMR, assuming one unsaturation per chain.

In another embodiment, the branched polyolefins comprise less than 20 wt % dimer and trimer (preferably less than 10 wt %, preferably less than 5 wt %, more preferably less than 2 wt %, based upon the weight of the copolymer composition), as measured by gas chromatography. "Dimer" (and "trimer") are defined as copolymers having two (or three) monomer units, where the monomer units may be the same or different from each other (where "different" means differing by at least one carbon). Products are analyzed by gas chromatograph (Agilent 6890N with auto-injector) using helium as a carrier gas at 38 cm/sec. A column having a length of 60 m (J & W Scientific DB-1, 60 m×0.25 mm I.D.×1.0 μm film thickness) packed with a flame ionization detector (FID), an Injector temperature of 250° C., and a Detector temperature of 250° C. are used. The sample is injected into the column in an oven at 70° C., then heated to 275° C. over 22 minutes (ramp rate 10° C./min to 100° C., 30° C./min to 275° C., hold). An internal standard, usually the monomer, is used to derive the amount of dimer or trimer product that is obtained. Yields of dimer and trimer product are calculated from the data recorded on the spectrometer. The amount of dimer or trimer product is calculated from the area under the relevant peak on the GC trace, relative to the internal standard.

In another embodiment, any of the branched polyolefins described herein contain less than 25 ppm hafnium or zirconium, preferably less than 10 ppm hafnium or zirconium, preferably less than 5 ppm hafnium or zirconium, based on the yield of polymer produced and the mass of catalyst employed. ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, eds., Butterworth-Heinemann, Boston, Mass., 1992, pp. 633-644, is used to determine the amount of an element in a material.

In yet other embodiments, the branched polyolefin is a liquid at 25° C.

In some embodiments, the branched polyolefin may be a homopolymer of propylene. The branched polyolefin may also be a copolymer, a terpolymer, or so on. In some embodiments herein, the branched polyolefin comprises from about 0.1 to 99.9 mol % (preferably from about 5 to about 90 mol %, from about 15 to about 85 mol %, from about 25 to about 80 mol %, from about 35 to about 75 mol %, or from about 45 to about 95 mol %) of propylene. In other embodiments, the branched polyolefin comprises greater than 5 mol % (preferably greater than 10 mol %, greater than 20 mol %, greater than 35 mol %, greater than 45 mol %, greater than 55 mol %, greater than 70 mol %, or greater than 85 mol %) of propylene.

In some embodiments, the branched polyolefin comprises $C_4$ to $C_{40}$ monomers, preferably $C_4$ to $C_{20}$ monomers, or preferably $C_4$ to $C_{12}$ monomers. The $C_4$ to $C_{40}$ monomers, may be linear or cyclic. The cyclic olefins may be strained or unstrained, monocyclic or polycyclic, and may optionally include hetero atoms and/or one or more functional groups. Exemplary monomers include butene, pentene, hexene, heptene, octene, nonene, decene, undecene, dodecene, norbornene, cyclopentene, cycloheptene, cyclooctene, cyclododecene, 7-oxanorbornene, substituted derivatives thereof, and isomers thereof, preferably hexane, heptene, octene, nonene, decene, dodecene, cyclooctene, 1-hydroxy-4-cyclooctene, 1-acetoxy-4-cyclooctene, cyclopentene, norbornene, and their respective homologs and derivatives.

In some embodiments, the branched polyolefin comprises two or more different $C_4$ to $C_{40}$ monomers, three or more different $C_4$ to $C_{40}$ monomers, or four or more different $C_4$ to $C_{40}$ monomers. In some embodiments herein, the branched polyolefin comprises from about 0.1 to 99.9 mol % (preferably from about 5 to about 90 mol %, from about 15 to about 85 mol %, from about 25 to about 80 mol %, from about 35 to about 75 mol %, or from about 45 to about 95 mol %) of at least one (preferably two or more, three or more, four or more, and the like) $C_4$ to $C_{40}$ (preferably butene, pentene, hexene, heptene, octene, nonene, decene, cyclopentene, cycloheptene, cyclooctene, cyclooctadiene, and isomers thereof) monomers. In other embodiments, the branched polyolefin comprises greater than 5 mol % (preferably greater than 10 mol %, greater than 20 mol %, greater than 35 mol %, greater than 45 mol %, greater than 55 mol %, greater than 70 mol %, or greater than 85 mol %) of $C_4$ to $C_{40}$ (preferably butene, pentene, hexene, octene, and decene) monomer.

In some embodiments, the branched polyolefins are homopolypropylene, propylene/ethylene copolymers, propylene/hexene copolymers, propylene/octene copolymers, propylene/decene copolymers, propylene/hexene/octene terpolymers, propylene/hexene/decene terpolymers, propylene/octene/decene terpolymers, and the like.

Uses of Vinyl Terminated Polymers

The vinyl terminated branched polymers prepared herein may be functionalized by reacting a heteroatom containing group with the allyl group of the polymer, with or without a catalyst. Examples include catalytic hydrosilylation, hydroformylation, hydroboration, epoxidation, hydration, dihydroxylation, hydroamination, or maleation with or without activators such as free radical generators (e.g., peroxides).

In some embodiments, the vinyl terminated branched polymers produced herein are functionalized as described in U.S. Pat. No. 6,022,929; A. Toyota, T. Tsutsui, and N. Kashiwa, Polymer Bulletin 48, pp. 213-219, 2002; J. Am. Chem. Soc., 1990, 112, pp. 7433-7434; and U.S. Ser. No. 12/487,739 filed on Jun. 19, 2009 (Published as WO 2009/155472).

The functionalized branched polymers can be used in oil additivation and many other applications. Preferred uses include additives for lubricants and/or fuels. Preferred heteroatom containing groups include amines, aldehydes, alcohols, acids, succinic acid, maleic acid, and maleic anhydride.

In particular embodiments herein, the vinyl terminated branched polymers disclosed herein, or functionalized analogs thereof, are useful as additives. In some embodiments, the vinyl terminated polymers disclosed herein, or functionalized analogs thereof, are useful as additives to a lubricant. Particular embodiments relate to a lubricant comprising the vinyl terminated polymers disclosed herein, or functionalized analogs thereof.

In other embodiments, the vinyl terminated branched polymers disclosed herein may be used as monomers for the preparation of polymer products. Processes that may be used for the preparation of these polymer products include coordinative polymerization and acid-catalyzed polymerization. In some embodiments, the polymeric products may be homopolymers. For example, if a vinyl terminated polymer (A) were used as a monomer, it is possible to form a homopolymer product with the formulation $(A)_n$, where n is the degree of polymerization.

In other embodiments, the polymer products formed from mixtures of monomer vinyl terminated polymers may be mixed polymers, comprising two or more repeating units that are different from each. For example, if a vinyl terminated polymer (A) and a different vinyl terminated polymer (B) were copolymerized, it is possible to form a mixed polymer product with the formulation $(A)_n(B)_m$, where n is the number of molar equivalents of vinyl terminated polymer (A) and m is the number of molar equivalents of vinyl terminated polymer (B) that are present in the mixed polymer product.

In yet other embodiments, polymer products may be formed from mixtures of the vinyl terminated branched polymer with another alkene. For example, if a vinyl terminated branched polymer (A) and alkene (B) were copolymerized, it is possible to form a mixed polymer product with the formulation $(A)_n(B)_m$, where n is the number of molar equivalents of vinyl terminated polymer and m is the number of molar equivalents of alkene that are present in the mixed polymer product.

In another embodiment, this invention relates to a functionalized branched polyolefin comprising the reaction product of a heteroatom containing group and any vinyl terminated branched polyolefin described herein, preferably where the functional group comprises one or more heteroatoms selected from the group consisting of P, O, S, N, Br, Cl, F, I, and/or B, and the functionalized branched polyolefin has 0.60 to 1.2, alternately, 0.75 to 1.10, functional groups per chain (preferably assuming that Mn has not altered by more than 15% as compared to the Mn of the vinyl terminated branched polyolefin prior to functionalization and optional derivatization). The number of functional groups per chain (F/Mn) is determined by $^1$H NMR as described in WO 2009/155472 (See pages 26 to 27, paragraphs [00111] to [00114], including that VDRA is VRDA, which is the normalized integrated signal intensity for the vinylidene resonances between from about 4.65 to 4.85 ppm and the vinylene resonances at from about 5.15 to 5.6 ppm.)

Preferred heteroatom containing groups comprise one or more of sulfonates, amines, aldehydes, alcohols, or acids, preferably the heteroatom containing group comprises an epoxide, succinic acid, maleic acid or maleic anhydride, alternately the heteroatom containing group comprises one or more of acids, esters, anhydrides, acid-esters, oxycarbonyls, carbonyls, formyls, formylcarbonyls, hydroxyls, and acetyl halides.

Percent functionalization of the branched polyolefin= (F*100)/(F+VI+VE). The number of vinyl groups/1000 carbons (VI*) and number of vinylidene groups/1000 carbons (VE*) for the functionalized branched polyolefin are determined from the $^1$H NMR spectra of the functionalized polyolefin in the same manner as VI and VE for the unfunctionalized polymer. Preferably, the percent functionalization of the branched polyolefin is 75% or more, preferably 80% or more, preferably 90% or more, preferably 95% or more.

In another embodiment the functionalized polyolefins described herein have the same Mn, and/or Mw and/or Mz as, or up to 15% greater than (preferably up to 10% greater than), as the starting vinyl terminated polyolefins, "same" is defined to mean within 5%.

In another embodiment, the vinyl terminated branched polyolefins described herein can be use in any process, blend, product, or composition disclosed in WO 2009/155472, which is incorporated by reference herein. In some embodiments, the composition is a lubricant blend, an adhesive, or a wax. In some embodiments, the invention relates to the use of the composition as a lubricant blend, an adhesive, or a wax.

In another embodiment this invention relates to:
1. A process for polymerization, comprising:
(i) contacting, preferably at a temperature greater than 35° C. (more preferably in the range of from about 35 to 150° C., from 40 to 140° C., from 60 to 140° C., or from 80 to 130° C.) and, optionally, at a pressure in the range of from about 0.35 to 10 MPa (preferably from 0.45 to 6 MPa or from 0.5 to 4 MPa), one or more monomers comprising ethylene and/or propylene (preferably propylene) and optionally, one or more $C_4$ to $C_{40}$ alpha olefin monomers (preferably $C_4$ to $C_{20}$ alpha olefin monomers, preferably $C_4$ to $C_{12}$ alpha olefin monomers, preferably butene, pentene, hexene, heptene, octene, nonene, decene, cyclopentene, cycloheptene, cyclooctene, cyclooctadiene, and isomers thereof), with a catalyst system capable of producing a branched polyolefin, preferably the catalyst system comprises a metallocene catalyst compound and an activator (preferably the activator is a non-alumoxane compound, preferably alumoxane is present at 0 wt %, preferably the activator is a non-coordinating anion activator) (alternately the catalyst system is a mixed catalyst system comprising one or more non-metallocene catalyst compounds, one or more metallocene catalyst compounds, or a combination thereof, preferably the catalyst system comprises a single metallocene catalyst), wherein the metallocene catalyst compound is represented by the following formula:

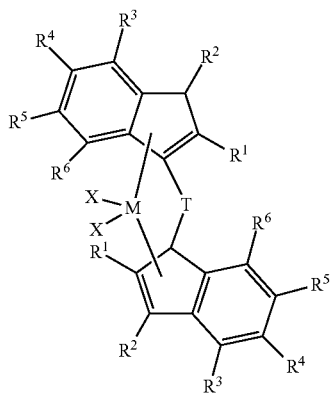

where
M is selected from the group consisting of zirconium or hafnium (preferably hafnium); each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system) (preferably X is a halide or a hydrocarbyl radical having from 1 to 20 carbon atoms, preferably X is chloride or methyl);
each $R^1$, $R^2$, $R^3$, $R^4$, $R^5$, and $R^6$, is, independently, hydrogen or a substituted or unsubstituted hydrocarbyl group, a heteroatom or heteroatom containing group;
further provided that any two adjacent R groups may form a fused ring or multicenter fused ring system where the rings may be aromatic, partially saturated or saturated; and
further provided that any of adjacent $R^4$, $R^5$, and $R^6$ groups may form a fused ring or multicenter fused ring system where the rings may be aromatic, partially saturated or saturated;
T is a bridging group represented by the formula $R_2{}^aJ$, where J is one or more of C, Si, Ge, N or P (preferably J is Si), and each $R^a$ is, independently, hydrogen, halogen, $C_1$ to $C_{20}$ hydrocarbyl or a $C_1$ to $C_{20}$ substituted hydrocarbyl, (preferably $R^a$ is methyl, ethyl, chloride) provided that at least one $R^3$, preferably both, are a substituted or unsubstituted phenyl group, if any of $R^1$, $R^2$, $R^4$, $R^5$ or $R^6$ are not hydrogen;
(ii) preferably converting at least 50 mol % of the monomer to polyolefin, more preferably at least 60 mol %, at least 70 mol %, at least 80 mol %; and
(iii) obtaining a branched polyolefin having greater than 50% allyl chain ends, relative to total unsaturated chain ends (preferably 60% or more, preferably 70% or more, preferably 80% or more, preferably 90% or more, preferably 95% or more) and a Tm of 60° C. or more (preferably 100° C. or more, preferably 120° C. or more).
2. The processes of paragraph 1 or 12, wherein butene comonomer is present and a mixed butene stream is the source of the butene comonomer.
3. The processes of paragraphs 1, 2, or 12, wherein the activator is a bulky activator represented by the formula:

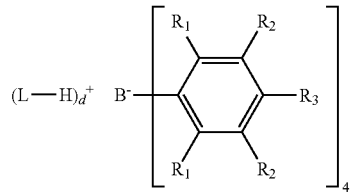

where
each $R_1$ is, independently, a halide, preferably a fluoride;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group);
each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring);
L is an neutral Lewis base;
$(L-F)^+$ is a Bronsted acid;
d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

4. The process of paragraph 3, wherein the bulky activator is at least one of: trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, and [4-t-butyl-PhNMe$_2$H] [(m-C$_6$F$_5$—C$_6$F$_4$)$_4$B].

5. The process of paragraph 1, 2, 3, 4, or 12, wherein the process occurs in a single reaction zone (preferably a solution polymerization).

6. The process of paragraph 1, 2, 3, 4, 5, or 12, wherein the productivity is 4500 g/mmol or more (preferably 5000 g/mmol or more, preferably 10,000 g/mmol or more, preferably 50,000 g/mmol or more; alternately the productivity is at least 80,000 g/mmol, preferably at least 150,000 g/mmol, preferably at least 200,000 g/mmol, preferably at least 250,000 g/mmol, preferably at least 300,000 g/mmol).

7. The process of paragraph 1, 2, 3, 4, 5, 6, or 12, wherein the residence time of the polymerization is up to 300 minutes (preferably in the range of from about 1 to 300 minutes, preferably from about 5 to 250 minutes, or preferably from about 10 to 120 minutes).

8. A branched polyolefin produced by the process of paragraphs 1 to 7 or 12, having an Mn (measured by $^1$H NMR) of 7,500 to 60,000 g/mol, comprising one or more alpha olefins (preferably propylene and/or ethylene, preferably propylene) and, optionally, one or more C$_4$ to C$_{40}$ alpha olefin monomers (preferably C$_4$ to C$_{20}$ alpha olefin monomers, preferably C$_4$ to C$_{12}$ alpha olefin monomers, preferably butene, pentene, hexene, heptene, octene, nonene, decene, cyclopentene, cycloheptene, cyclooctene, cyclooctadiene, and isomers thereof) and having:

(i) 50% or greater allyl chain ends, relative to total number of unsaturated chain ends (preferably 60% or more, preferably 70% or more, preferably 75% or more, preferably 80% or more, preferably 90% or more, preferably 95% or more);

(ii) a g'vis of 0.90 or less (preferably 0.85 or less, preferably 0.80 or less) and/or a ratio of percentage of saturated chain ends (preferably isobutyl chain ends) to percentage of allyl chain ends of 1.2 to 2.0 (preferably 1.6 to 1.8), and/or a ratio of Mn(GPC)/Mn($^1$H NMR) of 0.95 or less (preferably 0.90 or less, preferably 0.85 or less, preferably 0.80 or less);

(iii) optionally, a Tm of greater than 60° C. (preferably greater than 100° C., preferably from 60 to 180° C., preferably from 80 to 175° C.);

(iv) optionally, an Hf of greater than 7 J/g (preferably greater than 15 J/g, greater than 30 J/g, greater than 50 J/g, greater than 60 J/g, or greater than 80 J/g);

(v) optionally, an allyl chain end to internal vinylidene ratio of greater than 5:1 (preferably greater than 10:1);

(vi) optionally, an allyl chain end to vinylidene chain end ratio of greater than 10:1 (preferably greater than 15:1); and (vii) optionally, an allyl chain end to vinylene chain end ratio of greater than 1:1 (preferably greater than 2:1, greater than 5:1, or greater than 10:1).

9. A branched polyolefin produced by the process of paragraphs 1 to 7 or 12, having an Mn (measured by GPC) of greater than 60,000 g/mol, comprising one or more alpha olefins (preferably propylene and/or ethylene, preferably propylene) and, optionally, one or more C$_4$ to C$_{40}$ alpha olefin monomers (preferably C$_4$ to C$_{20}$ alpha olefin monomers, preferably C$_4$ to C$_{12}$ alpha olefin monomers, preferably butene, pentene, hexene, heptene, octene, nonene, decene, cyclopentene, cycloheptene, cyclooctene, cyclooctadiene, and isomers thereof) and having:

(i) 50% or greater allyl chain ends, relative to total number of unsaturated chain ends (preferably 60% or more, preferably 70% or more, preferably 75% or more, preferably 80% or more, preferably 90% or more, preferably 95% or more);

(ii) having a g'vis of 0.90 or less (preferably 0.85 or less, preferably 0.80 or less);

(iii) optionally, a bromine number which, upon complete hydrogenation, decreases by at least 50% (preferably at least 75%);

(iv) optionally, a Tm of greater than 60° C. (preferably greater than 100° C., preferably from 60 to 180° C., preferably from 80 to 175° C.); and (v) optionally, an Hf of greater than 7 J/g (preferably greater than 15 J/g, greater than 30 J/g, greater than 50 J/g, greater than 60 J/g, or greater than 80 J/g).

10. A branched polyolefin produced by the process of paragraph 1 to 7 or 12, having an Mn (measured by $^1$H NMR) of less than 7,500 g/mol, preferably from 100 up to 7,500 g/mol, comprising one or more alpha olefins (preferably propylene and/or ethylene, preferably propylene) and, optionally, one or more C$_4$ to C$_{40}$ alpha olefin monomers (preferably C$_4$ to C$_{20}$ alpha olefin monomers, preferably C$_4$ to C$_{12}$ alpha olefin monomers, preferably butene, pentene, hexene, heptene, octene, nonene, decene, cyclopentene, cycloheptene, cyclooctene, cyclooctadiene, and isomers thereof) and having:

(i) 50% or greater allyl chain ends, relative to total number of unsaturated chain ends (preferably 60% or more, preferably 70% or more, preferably 75% or more, preferably 80% or more, preferably 90% or more, preferably 95% or more);

(ii) a ratio of percentage of saturated chain ends (preferably isobutyl chain ends) to percentage of allyl chain ends of 1.2 to 2.0 (preferably 1.6 to 1.8), and/or a ratio of Mn(GPC)/Mn($^1$H NMR) of 0.95 or less (preferably 0.90 or less, preferably 0.85 or less, preferably 0.80 or less);

(iii) optionally, a Tm of greater than 60° C. (preferably greater than 100° C., preferably from 60 to 180° C., preferably from 80 to 175° C.);

(iv) optionally, an Hf of greater than 7 J/g (preferably greater than 15 J/g, greater than 30 J/g, greater than 50 J/g, greater than 60 J/g, or greater than 80 J/g);

(v) optionally, an allyl chain end to internal vinylidene ratio of greater than 5:1 (preferably greater than 10:1);

(vi) optionally, an allyl chain end to vinylidene chain end ratio of greater than 10:1 (preferably greater than 15:1); and (vii) optionally, an allyl chain end to vinylene chain end ratio of greater than 1:1 (preferably greater than 2:1, greater than 5:1, or greater than 10:1).

11. A functionalized branched polyolefin of paragraphs 8 to 10, wherein the functional group is selected from amines, aldehydes, alcohols, acids, succinic acid, maleic acid, and maleic anhydride.

12. A process for polymerization, comprising:
(i) contacting, at a temperature greater than 35° C. (preferably in the range of from about 35 to 150° C., from 40 to 140° C., from 60 to 140° C., or from 80 to 130° C.) and, optionally, a pressure in the range of from about 0.35 to 10 MPa (preferably from 0.45 to 6 MPa or from 0.5 to 4 MPa), one or more monomers comprising ethylene and/or propylene (preferably propylene) and optionally, one or more $C_4$ to $C_{40}$ alpha olefin monomers (preferably $C_4$ to $C_{20}$ alpha olefin monomers, preferably $C_4$ to $C_{12}$ alpha olefin monomers, preferably butene, pentene, hexene, heptene, octene, nonene, decene, cyclopentene, cycloheptene, cyclooctene, cyclooctadiene, and isomers thereof), with a catalyst system capable of producing a branched polyolefin, preferably the catalyst system comprises a metallocene catalyst compound and an activator (preferably the activator is a non-alumoxane compound, preferably alumoxane is present at 0 wt %, preferably the activator is a non-coordinating anion activator) (alternately the catalyst system is a mixed catalyst system comprising one or more non-metallocene catalyst compounds, one or more metallocene catalyst compounds, or a combination thereof, preferably the catalyst system comprises a single metallocene catalyst), wherein the metallocene catalyst compound is represented by the following formula:

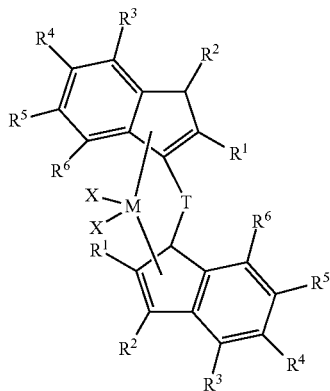

where
M is selected from the group consisting of zirconium or hafnium (preferably hafnium);
each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system) (preferably X is a halide or a hydrocarbyl radical having from 1 to 20 carbon atoms, preferably X is chloride or methyl);
each $R^1$, $R^2$, $R^3$, $R^4$, $R^5$, and $R^6$, is, independently, hydrogen or a substituted or unsubstituted hydrocarbyl group, a heteroatom or heteroatom containing group;
further provided that any two adjacent R groups may form a fused ring or multicenter fused ring system where the rings may be aromatic, partially saturated or saturated; and
further provided that any of adjacent $R^4$, $R^5$, and $R^6$ groups may form a fused ring or multicenter fused ring system where the rings may be aromatic, partially saturated or saturated;
T is a bridging group represented by the formula $R_2{}^aJ$, where J is one or more of C, Si, Ge, N or P (preferably J is Si), and each $R^a$ is, independently, hydrogen, halogen, $C_1$ to $C_{20}$ hydrocarbyl or a $C_1$ to $C_{20}$ substituted hydrocarbyl, (preferably $R^a$ is methyl, ethyl, chloride) provided that at least one $R^3$, preferably both, are a substituted or unsubstituted phenyl group, if any of $R^1$, $R^2$, $R^4$, $R^5$ or $R^6$ are not hydrogen;
(ii) converting at least 50 mol % of the monomer to polyolefin (preferably at least 60 mol %, at least 70 mol %, at least 80 mol %); and
(iii) obtaining a branched polyolefin having greater than 50% allyl chain ends, relative to total unsaturated chain ends (preferably 60% or more, preferably 70% or more, preferably 80% or more, preferably 90% or more, preferably 95% or more) and a Tm of 60° C. or more (preferably 100° C. or more, preferably 120° C. or more).

EXAMPLES

Product Characterization

Products were characterized by $^1$H NMR, GPC-3D, and DSC, as indicated above.
Metallocenes Used in Examples
The following metallocenes were used in the examples below.

| Metallocene | Structure |
|---|---|
| A | |
| B | |
| C | |

Metallocenes A and C were obtained from Albemarle (Baton Rouge, La.) and used without further purification. Metallocene B was synthesized as shown below.
Synthesis of Metallocene B
Typical dry-box procedures for synthesis of air-sensitive compounds were followed including using dried glassware (90° C., 4 hours) and anhydrous solvents purchased from Sigma Aldrich (St. Louis, Mo.) which were further dried over 3 Å sieves. All reagents were purchased from Sigma-Aldrich (Milwaukee, Wis.) and used without further purification, unless otherwise noted.
The dichloride precursor of Metallocene B (B—$Cl_2$) was obtained from Albemarle, and converted to Metallocene B using the following procedure: Under inert atmosphere, in a purged Vacuum Atmospheres™ dry box, 3.02 g of B—$Cl_2$ was dissolved in 150 mL of dried toluene in a 250 mL single neck round-bottom flask. To this 4.0 mL (5 eq) of 3.0M methylmagnesium bromide was added dropwise. The solution was heated in an oil bath at 90° C. overnight. The mixture was then allowed to cool to room temperature, at which time 10.0 mL of trimethylsilylchloride was added drop-wise. After stirring for 10 min, 10.0 mL of dried 1,4-dioxane was added and the mixture stirred an additional 10 min. The mixture was then filtered through an oven dried fine fritted funnel to remove magnesium salts. The flask was rinsed with about 20 mL n-pentane and this was combined with the filtrate by passing through the frit. Solvent was removed under vacuum to yield 2.23 g of Metallocene B as an off-white powder (74% yield).

Activators Used in Examples

The following activators were used in the examples below. Activators I and III were purchased from Albemarle. Activator II was purchased from Single Site Catalyst.

| Activator | Chemical Name |
|---|---|
| I | Dimethylaniliniumtetrakis(pentafluorophenyl)borate |
| II | Trityl(perfluorophenyl)borate |
| III | Dimethylaniliniumtetrakis(perfluoronaphthyl)borate |

Polymerization Conditions for Examples 1-2

All of the examples were produced in a 0.5-liter Autoclave reactor operated in the continuous stirred-tank solution process. The autoclave was equipped with a stirrer, a water-cooling/steam-heating element with a temperature controller, and a pressure controller.

Solvents, monomers such as propylene were first purified by passing through a three-column purification system. Purification columns were regenerated periodically whenever there was evidence of lower activity of polymerization.

The solvent feed to the reactors was measured by a mass-flow meter. A Pulsa feed pump controlled the solvent flow rate and increased the solvent pressure to the reactors. The compressed, liquefied propylene feed was measured by a mass flow meter and the flow was controlled by a Pulsa feed pump. The solvent and monomers were fed into a manifold first. The mixture of solvent and monomers were then chilled to about −15° C. by passing through a chiller prior to feeding into the reactor through a single tube. The collected samples were first air-dried in a hood to evaporate most of the solvent, and then dried in a vacuum oven at a temperature of about 90° C. for about 12 hours. The vacuum oven dried samples were weighed to obtain yields. Monomer conversion was calculated basing the polymer yield on the amount of monomers fed into the reactor. All the reactions were carried out at a pressure of about 2.4 MPa/g.

Catalysts used in the following examples were rac-dimethylsilyl bisindenyl hafnium dimethyl (Catalyst A), rac-dimethylsily bis(2-methylindenyl)zirconium dimethyl (Catalyst B), and rac-dimethylsilyl bis(2-methyl-4-phenylindenyl) zirconium dimethyl (Catalyst C). The activators used were N,N-dimethylanilinium tetrakis(pentafluorophenyl) borate (Activator I), trityl tetrakis(pentafluorophenyl)borate (Activator II), and N,N-dimethyl anilinium tetrakis(heptafluoro-2-naphthyl)borate (Activator III). All of the metallocene catalysts were preactivated with an activator at a molar ratio of about 1:1 in 900 ml of toluene. All catalyst solutions were kept in an inert atmosphere and fed into reactors by metering pumps. Tri-n-octylaluminum (TNOAL) solution (available from Sigma Aldrich, Milwaukee, Wis.) was further diluted in isohexane and used as a scavenger.

Propylene Polymerizations

The polymerization conditions, % conversion of feed, and catalyst productivity are listed in Table 1, below. In all runs, inlet propylene feed concentration was between 3.5 and 4 M. Two standard cubic centimeter of $H_2$ was used in the feed of Run #42. Tri(n-octyl)aluminum (TNOAL) was used throughout as scavenger. Molar ratio of TNOAL to metallocene was about 20. Residence time was constant at 5 minutes.

TABLE 1

Conversion and Productivity

| RUN | Met.[1] | Act.[2] | $T_p$, °C. | % Conversion* | Productivity × $10^3$ kg/mol |
|---|---|---|---|---|---|
| 1 | B | I | 100 | 73.82 | 4.5 |
| 2 | B | I | 90 | 77.00 | 4.7 |
| 3 | B | I | 80 | 77.64 | 4.7 |
| 4 | B | I | 70 | 77.82 | 4.7 |
| 5 | B | I | 60 | 78.14 | 4.8 |
| 6 | B | II | 60 | 64.34 | 15.7 |
| 7 | B | II | 70 | 65.23 | 15.9 |
| 8 | B | II | 75 | 64.99 | 15.9 |
| 9 | B | II | 80 | 67.24 | 16.4 |
| 10 | B | II | 85 | 66.39 | 16.2 |
| 11 | B | II | 90 | 63.51 | 15.5 |
| 12 | B | II | 95 | 61.03 | 14.9 |
| 13 | B | II | 100 | 60.77 | 14.8 |
| 14 | B | II | 105 | 53.86 | 13.1 |
| 15 | B | II | 110 | 57.45 | 14.0 |
| 16 | B | III | 120 | 63.61 | 9.8 |
| 17 | B | III | 110 | 66.43 | 10.2 |
| 18 | B | III | 100 | 62.79 | 15.3 |
| 19 | B | III | 90 | 66.89 | 16.3 |
| 20 | B | III | 80 | 68.39 | 16.7 |
| 21 | B | III | 70 | 59.36 | 29.6 |
| 22 | C | I | 125 | 94.07 | 46.5 |
| 23 | C | I | 120 | 95.68 | 47.3 |
| 24 | C | I | 115 | 98.11 | 48.6 |
| 25 | C | I | 110 | 98.79 | 48.9 |
| 26 | C | I | 105 | 100.61 | 46.9 |
| 27 | C | I | 100 | 100.71 | 66.2 |
| 28 | C | I | 95 | 100.64 | 66.2 |
| 29 | C | I | 90 | 100.39 | 66.0 |
| 30 | C | II | 130 | 65.68 | 1.83 |
| 31 | C | II | 120 | 67.36 | 32.4 |
| 32 | C | II | 110 | 70.14 | 33.3 |
| 33 | C | II | 100 | 72.61 | 34.6 |
| 34 | C | II | 90 | 73.54 | 36.3 |
| 35 | C | II | 80 | 73.57 | 36.3 |
| 36 | C | III | 130 | 57.93 | 28.6 |
| 37 | C | III | 120 | 60.79 | 30.0 |
| 38 | C | III | 110 | 62.04 | 30.6 |
| 39 | C | III | 100 | 62.46 | 30.8 |
| 40 | C | III | 90 | 63.43 | 31.3 |
| 41 | A | I | 90 | — | — |
| 42 | A | I | 80 | — | — |
| 43 | A | I | 130 | 73.90 | 5.4 |
| 44 | A | I | 120 | 81.80 | 6.0 |
| 45 | A | I | 110 | 88.10 | 6.4 |
| 46 | A | I | 100 | 85.60 | 6.3 |
| 47 | A | I | 90 | 86.10 | 6.3 |
| 48 | A | I | 80 | 89.40 | 6.5 |
| 49 | A | I | 70 | — | — |
| 50 | A | I | 60 | 89.90 | 6.6 |
| 51 | A | II | 130 | 62.57 | 4.6 |
| 52 | A | II | 120 | 68.43 | 5.0 |
| 53 | A | II | 110 | 71.86 | 5.3 |
| 54 | A | II | 100 | 73.61 | 5.4 |
| 55 | A | II | 90 | 70.18 | 5.1 |
| 56 | A | II | 80 | 69.71 | 5.1 |
| 57 | A | II | 70 | 70.71 | 5.2 |
| 58 | A | II | 60 | — | — |
| 59 | A | III | 130 | 77.25 | 5.7 |
| 60 | A | III | 120 | 79.04 | 5.8 |
| 61 | A | III | 110 | 81.46 | 6.0 |
| 62 | A | III | 100 | 81.36 | 6.0 |
| 63 | A | III | 90 | 77.11 | 5.7 |
| 64 | A | III | 80 | 82.25 | 6.0 |
| 65 | A | III | 70 | 79.57 | 5.8 |

KEY:
[1]Met. = metallocene;
[2]Act. = Activator;
$T_p$ = polymerization reaction temperature;
*Propylene conversion calculated to be >100% is taken to be 100%.

Propylene conversion was high: 53 to 100%. Productivity of Metallocene C was observed to be 3 to 6 times higher than that of Metallocene A. The productivity of Metallocene B was comparable to Metallocene C, in most cases.

Characterization of Polymer Products

Differential Scanning Calorimetry (DSC)

Polymer from Runs 1-65 were analyzed using DSC. Data from the analysis of some of the polymer products is shown in the Table 2, below.

TABLE 2

Thermal Characterization of Polypropylene Products

| Polymer | Met.[1] | Act.[2] | $T_p$, °C. | Tm, °C. | Hf, J/g |
|---|---|---|---|---|---|
| 2 | B | I | 90 | — | — |
| 3 | B | I | 80 | 80.29 | 28.08 |
| 4 | B | I | 70 | 99.74 | 38.85 |
| 5 | B | I | 60 | 117.76 | 59.14 |
| 6 | B | II | 60 | 137.0 | 82.2 |
| 7 | B | II | 70 | 129.8 | 76.8 |
| 8 | B | II | 75 | 122.4 | 39.9 |
| 9 | B | II | 80 | — | — |
| 10 | B | II | 85 | 109.8 | 69.5 |
| 11 | B | II | 90 | 107.8 | 52.4 |
| 12 | B | II | 95 | 100.1 | 53.7 |
| 13 | B | II | 100 | 97.47 | 42.8 |
| 14 | B | II | 105 | 98.1 | 59.29 |
| 15 | B | II | 110 | 78.76 | 20.1 |
| 16 | B | III | 120 | 65.6 | 10.09 |
| 17 | B | III | 110 | 80.6 | 32.1 |
| 18 | B | III | 100 | 110.08 | 53.9 |
| 19 | B | III | 90 | 106.99 | 64.1 |
| 20 | B | III | 80 | 113.68 | 80.7 |
| 21 | B | III | 70 | 137.95 | 89.6 |
| 22 | C | I | 125 | 131.93 | 82.65 |
| 23 | C | I | 120 | 134.32 | 87.26 |
| 24 | C | I | 115 | 136.91 | 84.17 |
| 25 | C | I | 110 | 140.77 | 90.01 |
| 26 | C | I | 105 | 142.31 | 92.33 |
| 27 | C | I | 100 | 145.07 | 97.75 |
| 28 | C | I | 95 | 146.07 | 96.40 |
| 29 | C | I | 90 | 148.15 | 103.70 |
| 30 | C | II | 130 | 127.14 | 78.58 |
| 31 | C | II | 120 | 132.64 | 84.16 |
| 32 | C | II | 110 | 138.27 | 91.6 |
| 33 | C | II | 100 | 140.83 | 127.15 |
| 34 | C | II | 90 | 145.42 | 95.89 |
| 35 | C | II | 80 | 151.24 | 103.60 |
| 36 | C | III | 130 | 132.33 | 89.6 |
| 37 | C | III | 120 | 137.18 | 87.8 |
| 38 | C | III | 110 | 143.44 | 96.72 |
| 39 | C | III | 100 | 146.0 | 100.70 |
| 40 | C | III | 90 | 152.85 | 93.78 |
| 41 | A | I | 90 | — | — |
| 42 | A | I | 80 | 86.6 | 31.0 |
| 43 | A | I | 130 | 69.04 | 19.59 |
| 44 | A | I | 120 | 80.38 | 23.63 |
| 45 | A | I | 110 | 90.25 | 35.64 |
| 46 | A | I | 100 | 99.38 | 44.54 |
| 47 | A | I | 90 | 107.78 | 56.51 |
| 48 | A | I | 80 | 118.01 | 61.19 |
| 49 | A | I | 70 | 127.57 | 67.58 |
| 50 | A | I | 60 | 131.25 | 73.25 |
| 51 | A | II | 130 | 57.8 | 10.10 |
| 52 | A | II | 120 | 62.1 | 15.8 |
| 53 | A | II | 110 | 75.16 | 27.97 |
| 54 | A | II | 100 | 89.6 | 38.24 |
| 55 | A | II | 90 | 103.7 | 52.49 |
| 56 | A | II | 80 | 119.0 | 61.29 |
| 57 | A | II | 70 | 127.0 | 70.86 |
| 58 | A | II | 60 | 104.0 | 47.64 |
| 59 | A | III | 130 | 62.4 | 7.6 |
| 60 | A | III | 120 | 79.4 | 24.78 |
| 61 | A | III | 110 | 93.16 | 33.78 |
| 62 | A | III | 100 | 105.38 | 50.96 |
| 63 | A | III | 90 | 116.76 | 60.97 |
| 64 | A | III | 80 | 128.96 | 77.76 |
| 65 | A | III | 70 | 134.7 | 76.86 |

KEY:
[1]Met. = metallocene;
[2]Act. = Activator;
$T_p$ is polymerization reaction temperature;
*Propylene conversion calculated to be >100% is taken to be 100%.

Metallocene C offers excellent melting point capability. Increasing polymerization temperature results in a decrease in melting point. The decrease in melting point is thought to arise from a higher population of stereo- and region-defects in the products. Among the activators, Activator III appears to be the most effective at increasing the melting point.

Gel Permeation Chromatography (GPC-3D)

GPC 3D results for some of the polymers are summarized in Table 3.

TABLE 3

Summary of GPC-3D Data

| Polym Temp °C. | Run No. | Mn | Mw | Mz | g'vis |
|---|---|---|---|---|---|
| Metallocene B/Activator I | | | | | |
| 100 | 1 | — | — | — | — |
| 90 | 2 | 3,590 | 5,450 | 7,900 | |
| 80 | 3 | 5,440 | 8,330 | 12,630 | 0.91 |
| 70 | 4 | 8,810 | 13,040 | 18,860 | 0.98 |
| 60 | 5 | 14,240 | 21,740 | 31,360 | 0.97 |
| Metallocene B/Activator II | | | | | |
| 60 | 6 | 28,014 | 48,576 | 69,668 | 0.976 |
| 70 | 7 | 3,438 | 28,203 | 40,678 | 0.957 |
| 75 | 8 | 6,406 | 15,960 | 25,601 | 0.961 |
| 80 | 9 | 1,646 | 8,222 | 12,873 | 0.972 |
| 85 | 10 | 3,391 | 11,718 | 17,971 | 0.986 |
| 90 | 11 | 5,013 | 10,289 | 16,529 | 0.974 |
| 95 | 12 | 1,698 | 4,809 | 8,041 | 0.954 |
| 100 | 13 | 2,439 | 7,490 | 11,719 | 0.970 |
| 105 | 14 | 2,266 | 6,726 | 13,140 | 0.943 |
| 110 | 15 | 1,308 | 4,515 | 7,773 | 0.859 |
| Metallocene B/Activator III | | | | | |
| 120 | 16 | 2,693 | 10,701 | 23,039 | 0.977 |
| 110 | 17 | 8,427 | 19,411 | 35,295 | 0.887 |
| 100 | 18 | 5,751 | 33,934 | 61,807 | 1.005 |
| 90 | 19 | 7,980 | 13,832 | 21,377 | 0.970 |
| 80 | 20 | 8,688 | 18,937 | 28,533 | 0.942 |
| 70 | 21 | 26,036 | 45,472 | 70,218 | 1.008 |
| Metallocene C/Activator I | | | | | |
| 125 | 22 | 6,324 | 16,922 | 30,721 | — |
| 120 | 23 | 6,692 | 20,476 | 37,823 | 0.832 |
| 115 | 24 | 9,820 | 24,758 | 44,867 | 0.83 |
| 110 | 25 | 9,360 | 29,356 | 55,191 | 0.825 |
| 105 | 26 | 13,136 | 36,624 | 69,815 | 0.801 |
| 100 | 27 | 18,665 | 47,461 | 87,325 | — |
| 95 | 28 | 19,736 | 57,000 | 109,401 | 0.814 |
| 90 | 29 | 32,110 | 73,822 | 151,184 | 0.822 |

TABLE 3-continued

Summary of GPC-3D Data

| Polym Temp °C. | Run No. | Mn | Mw | Mz | g'vis |
|---|---|---|---|---|---|
| \multicolumn{6}{c}{Metallocene C/Activator II} ||||||
| 120 | 31 | 6,810 | 17,887 | 35,399 | 0.832 |
| 110 | 32 | 9,029 | 26,094 | 49,403 | 0.801 |
| 100 | 33 | 16,553 | 39,113 | 73,365 | 0.796 |
| 90 | 34 | 24,989 | 60,579 | 112,107 | 0.787 |
| 80 | 35 | 40,160 | 94,821 | 175,322 | 0.812 |
| Metallocene C/Activator III ||||||
| 130 | 36 | 8,679 | 21,099 | 45,377 | 0.818 |
| 120 | 37 | 16,218 | 35,192 | 70,346 | 0.816 |
| 110 | 38 | 24,286 | 59,994 | 119,250 | 0.791 |
| 100 | 39 | 36,835 | 96,306 | 183,656 | 0.807 |
| 90 | 40 | 56,615 | 158,033 | 303,296 | 0.800 |
| Metallocene A/Activator I ||||||
| 90 | 41 | 3,641 | 21,141 | 36,168 | 0.876 |
| 80 | 42 | 8,921 | 21,925 | 34,197 | 0.966 |
| 130 | 43 | 3,117 | 7,247 | 60,527 | 1.089 |
| 120 | 44 | — | — | — | — |
| 110 | 45 | 6,131 | 12,490 | 21,444 | 0.946 |
| 100 | 46 | — | — | — | — |
| 90 | 47 | 15,592 | 27,769 | 45,011 | 0.925 |
| 80 | 48 | — | — | — | — |
| 70 | 49 | 37,866 | 73,700 | 116,121 | 0.952 |
| 60 | 50 | — | — | — | — |
| Metallocene A/Activator II ||||||
| 130 | 51 | 156 | 7,320 | 39,833 | 0.695 |
| 120 | 52 | 3,235 | 6,773 | 12,905 | 0.941 |
| 110 | 53 | 405 | 12,346 | 40,531 | 0.844 |
| 100 | 54 | 7,632 | 15,444 | 26,660 | 0.915 |
| 90 | 55 | 2,749 | 30,059 | 67,565 | 0.870 |
| 80 | 56 | 20,402 | 38,965 | 63,618 | 0.963 |
| 70 | 57 | 33,090 | 66,336 | 109,933 | 1.022 |
| 60 | 58 | — | — | — | — |
| Metallocene A/Activator III ||||||
| 130 | 59 | 4,152 | 16,575 | 32,527 | 0.811 |
| 120 | 60 | 11,452 | 27,160 | 51,854 | 0.852 |
| 110 | 61 | 18,170 | 51,559 | 119,333 | 0.832 |
| 100 | 62 | 31,274 | 80,916 | 155,858 | 0.819 |
| 90 | 63 | 44,361 | 189,479 | 714,702 | 0.775 |
| 80 | 64 | 64,545 | 148,873 | 254,838 | 0.933 |
| 70 | 65 | 20,820 | 189,133 | 348,530 | 1.002 |

Molecular weight was observed to decrease with increasing polymerization temperature. Significant enhancement of Mw, for all three metallocenes, was observed when Activator III was used. Polymers made with Activators I and II tended to fall in the same Mw range for each metallocene, within the temperature range tested.

Taking the DSC and GPC data together, the following metallocene/activator trends (1) and (2) were observed when comparison was made at the same polymerization temperature:

$$Mw: C/III > A/III > C/I \geq C/II > B/III > A/I \approx A/II > B/I > B/II \quad (1)$$

$$Tm: C/III > C/I \geq C/II > A/III > A/I \approx A/II > B/III > B/II > B/I \quad (2)$$

Depression of g'vis with increasing Mw was observed in most GPC chromatograms, and this was taken as evidence of long chain branching. In FIG. 2, g' f(log Mw) was compared for four of the Metallocene A/Activator III products. All four show signatures for substantial long chain branching. Other products, such as those obtained using Metallocene B/Activator I and Metallocene B/Activator II have g' f(log MW) plots consistent with much less LCB. All these products were made under relatively high propylene conversion conditions (60 to 100%) that may be conducive to long chain branching.

$^1$HNMR Results

Data from the analysis of some of the polymer products of Runs 1-65 is shown in the Table 4, below.

TABLE 4

Summary Of Olefin Populations Measured by $^1$H NMR

| Sample | Tp, °C. | Olefin/1000 C. | | | Mn × 1000 | |
| | | Vinyl | Vinylidene | Vinylene | $^1$H NMR | GPC |
|---|---|---|---|---|---|---|
| \multicolumn{7}{c}{Metallocene B/Activator I} |||||||
| 2 | 90 | 0.25 | 4.42 | 0.08 | 2.95 | 3.59 |
| 3 | 80 | 0.13 | 3.14 | 0.03 | 4.24 | 5.44 |
| 4 | 70 | 0.05 | 2.00 | 0.00 | 6.83 | 8.81 |
| 5 | 60 | 0.00 | 1.30 | 0.00 | 10.8 | 14.24 |
| Metallocene B/Activator II |||||||
| 6 | 60 | 0.04 | 0.52 | 0.00 | 23.2 | 28.4 |
| 9 | 80 | 0.24 | 0.82 | 0.01 | 10.8 | 1.6 |
| 12 | 95 | 0.39 | 2.16 | 0.06 | 5.1 | 1.7 |
| 15 | 110 | 0.72 | 4.33 | 0.09 | 2.7 | 1.3 |
| Metallocene B/Activator III |||||||
| 16 | 120 | 1.09 | 1.39 | 0.01 | 5.53 | 10.0 |
| 18 | 100 | 0.29 | 0.42 | 0.00 | 18.7 | 24.4 |
| 20 | 80 | 0.27 | 1.13 | 0.01 | 8.4 | 13.0 |
| 21 | 70 | 0.14 | 0.23 | 0.05 | 21.5 | 30.5 |
| Metallocene C/Activator I |||||||
| 22 | 125 | — | — | — | — | — |
| 23 | 120 | 0.93 | 1.14 | 0 | 6.76 | 6.69 |
| 24 | 115 | 0.51 | 0.82 | 0.09 | 9.86 | 9.82 |
| 25 | 110 | 0.78 | 1.21 | 0.11 | 6.67 | 9.36 |
| 26 | 105 | — | — | — | — | — |
| 27 | 100 | — | — | — | — | — |
| 28 | 95 | 0.24 | 0.43 | 0.08 | 18.7 | 19.74 |
| 29 | 90 | 0.21 | 0.28 | 0.15 | 18.9 | 32.11 |
| Metallocene C/Activator II |||||||
| 30 | 130 | 0.99 | 1.11 | 0.01 | 6.1 | 6.0 |
| 32 | 110 | 0.46 | 0.40 | 0.01 | 14.4 | 9.0 |
| 34 | 90 | 0.17 | 0.35 | 0.00 | 23.7 | 25.0 |
| Metallocene C/Activator III |||||||
| 36 | 130 | 0.78 | 0.47 | 0.03 | 10.5 | 8.7 |
| 38 | 110 | 0.37 | 0.19 | 0.00 | 23.7 | 24.3 |
| 40 | 90 | 0.25 | 0.22 | 0.01 | 29.2 | 56.6 |
| Metallocene A/Activator I |||||||
| 43 | 130 | 1.58 | 2.18 | 0.06 | 3.66 | 3.12 |
| 44 | 120 | 0.85 | 1.87 | 0.05 | 5.05 | — |
| 45 | 110 | 0.49 | 1.55 | 0.07 | 6.64 | 6.13 |
| 46 | 100 | 0.26 | 1.12 | 0.04 | 9.86 | — |
| 47 | 90 | 0.12 | 0.82 | 0.04 | 14.29 | 15.59 |
| 48 | 80 | 0.05 | 0.48 | 0.04 | 24.56 | — |
| 49 | 70 | 0.11 | 0.28 | 0.05 | 31.82 | 37.87 |
| 50 | 60 | 0.04 | 0.23 | 0.04 | 45.16 | — |
| Metallocene A/Activator II |||||||
| 51 | 130 | 1.90 | 3.24 | 0.27 | 2.6 | 0.2 |
| 53 | 110 | 0.63 | 2.06 | 0.08 | 5.0 | 0.4 |
| 55 | 90 | 0.17 | 0.92 | 0.17 | 11.1 | 2.8 |
| 57 | 70 | 0.03 | 0.26 | 0.04 | 40.0 | 33.1 |
| Metallocene A/Activator III |||||||
| 59 | 130 | 1.67 | 0.31 | 0.02 | 6.4 | 4.2 |
| 61 | 110 | 0.50 | 0.18 | 0.03 | 19.7 | 18.2 |
| 63 | 90 | 0.09 | 0.03 | 0.03 | 82.4 | 44.4 |
| 65 | 70 | 0.28 | 0.19 | 0.00 | 29.2 | 20.8 |

$^1$H NMR spectra were recorded for most samples. A summary of the concentrations of the olefin unsaturations is provided in Table 4. The number average molecular weight of each sample was calculated from the $^1$H NMR data assuming one unsaturation per chain, and in Table 4 these values were compared with the number average molecular weights derived from GPC. Given signal-to-noise limitations, Mn calculated from $^1$H NMR is considered reasonably reliable up to about 50,000 g/mol. A parity plot of Mn ($^1$H NMR) versus Mn (GPC-DRI) is shown in FIG. 1. In most cases, Mns derived from the two methods are in close agreement, although there are notable exceptions. Departures from parity are thought to be due to contributions from long chain branching.

For a given polymerization temperature, the ranking of % vinyl as a function of metallocene-activator used is summarized in (3) below:

% vinyl:A/III>C/III>B/III>C/II>C/I>A/I≥B/II~A/ II>B/I          (3)

It was also observed that % vinyl generally increases, often substantially, with increasing polymerization temperature for every metallocene/activator pair examined All documents described herein are incorporated by reference herein, including any priority documents, related applications and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise, "comprising" encompasses the terms "consisting essentially of," "is," and "consisting of" and any place "comprising" is used "consisting essentially of," "is," or "consisting of" may be substituted therefore.

What is claimed is:

1. A branched polyolefin having an Mn ($^1$H NMR) of 7,500 to 60,000 g/mol, comprising one or more alpha olefin derived units comprising ethylene and/or propylene, and having;
   (i) 50% or greater allyl chain ends, relative to total number of unsaturated chain ends;
   (ii) a g'vis of 0.90 or less; and
   (iii) a ratio of percentage of saturated chain ends to percentage of allyl chain ends of 1.2 to 2.0.

2. The branched polyolefin of claim 1, comprising propylene and ethylene derived units.

3. The branched polyolefin of claim 1, further comprising $C_4$ to $C_{40}$ alpha olefin derived units.

4. The branched polyolefin of claim 1, having a ratio of Mn(GPC)/Mn($^1$H NMR) of 0.95 or less.

5. The branched polyolefin of claim 1, having a Tm of greater than 60° C.

6. The branched polyolefin of claim 1, having an Hf of greater than 7 J/g.

7. The branched polyolefin of claim 1, having an allyl chain end to internal vinylidene ratio of greater than 5:1.

8. The branched polyolefin of claim 1, having an allyl chain end to vinylidene chain end ratio of greater than 10:1.

9. A branched polyolefin having an Mn (GPC) greater than 60,000 g/mol, comprising one or more alpha olefin derived units comprising ethylene and/or propylene, and having:
   (i) 50% or greater allyl chain ends, relative to total unsaturated chain ends;
   (ii) a g'vis of 0.90 or less; and
   (iii) a bromine number which, upon complete hydrogenation, decreases by at least 50%.

10. The branched polyolefin of claim 9, comprising propylene and ethylene derived units.

11. The branched polyolefin of claim 9, further comprising $C_4$ to $C_{40}$ alpha olefin derived units.

12. The branched polyolefin of claim 9, having a Tm of greater than 60° C.

13. The branched polyolefin of claim 9, having an Hf of greater than 7 J/g.

14. A branched polyolefin having an Mn ($^1$H NMR) of less than 7,500 g/mol, comprising one or more alpha olefin derived units comprising ethylene and/or propylene, and having;
   (i) a ratio of percentage of saturated chain ends to percentage of allyl chain ends of 1.2 to 2.0; and
   (ii) 50% or greater allyl chain ends, relative to total moles of unsaturated chain ends.

15. The branched polyolefin of claim 14, having an Mn of greater than 100 g/mol.

16. The branched polyolefin of claim 14, comprising propylene and ethylene derived units.

17. The branched polyolefin of claim 14, further comprising $C_4$ to $C_{40}$ alpha olefin derived units.

18. The branched polyolefin of claim 14, having a ratio of Mn(GPC)/Mn($^1$H NMR) of 0.95 or less.

19. The branched polyolefin of claim 14, having a Tm of greater than 60° C.

20. The branched polyolefin of claim 14, having an Hf of greater than 7 J/g.

21. The branched polyolefin of claim 14, having an allyl chain end to internal vinylidene ratio of greater than 5:1.

22. The branched polyolefin of claim 14, having an allyl chain end to vinylidene chain end ratio of greater than 10:1.

* * * * *